United States Patent
Yun et al.

(10) Patent No.: US 11,151,453 B2
(45) Date of Patent: Oct. 19, 2021

(54) DEVICE AND METHOD FOR RECOMMENDING PRODUCT

(71) Applicant: Samsung Electronics Co., Ltd., Suwon-si (KR)

(72) Inventors: So-jung Yun, Seoul (KR); Jun-ik Jang, Bucheon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/469,280

(22) PCT Filed: Jan. 29, 2018

(86) PCT No.: PCT/KR2018/001240
§ 371 (c)(1),
(2) Date: Jun. 13, 2019

(87) PCT Pub. No.: WO2018/143630
PCT Pub. Date: Aug. 9, 2018

(65) Prior Publication Data
US 2020/0104703 A1 Apr. 2, 2020

(30) Foreign Application Priority Data

Feb. 1, 2017 (KR) .......................... 10-2017-0014376
Jan. 22, 2018 (KR) .......................... 10-2018-0007889

(51) Int. Cl.
*G06N 3/08* (2006.01)
*G06N 20/00* (2019.01)
(Continued)

(52) U.S. Cl.
CPC ........... *G06N 3/08* (2013.01); *G06K 9/00281* (2013.01); *G06K 9/00288* (2013.01);
(Continued)

(58) Field of Classification Search
CPC ........ G06N 3/08; G06N 3/0454; G06N 20/00; G06K 9/00281; G06K 9/00288; G06K 9/00302
See application file for complete search history.

(56) References Cited

U.S. PATENT DOCUMENTS 5,774,591 A * 6/1998 Black ................. G06K 9/00248
382/118
8,219,438 B1 * 7/2012 Moon ................ G06Q 30/0201
705/7.29
(Continued)

FOREIGN PATENT DOCUMENTS

CN 103488974 A 1/2014
CN 103765462 A 4/2014
(Continued)

OTHER PUBLICATIONS

Extended European Search Report dated Oct. 18, 2019, issued in European Patent Application No. 18747326.9.
(Continued)

*Primary Examiner* — Tadesse Hailu
(74) *Attorney, Agent, or Firm* — Jefferson IP Law, LLP

(57) ABSTRACT

Provided is an artificial intelligence (AI) system for simulating human brain functions such as perception and judgment by using a machine learning algorithm such as deep learning, and an application thereof. Provided is a device and method for recommending products to a user on the basis of facial expression information of the user through the AI system.
The method, performed by the device, of recommending products includes: displaying a product selected by the user; obtaining user's facial expression information with respect to the displayed product; determining the user's satisfaction with the displayed product based on the obtained user's facial expression information; selecting a product set to be
(Continued)

recommended to the user from among a plurality of product sets based on the determined user's satisfaction; and displaying at least one product included in the selected product set.

16 Claims, 17 Drawing Sheets

(51) Int. Cl.
  *G06K 9/00* (2006.01)
  *G06N 3/04* (2006.01)
(52) U.S. Cl.
  CPC ....... *G06K 9/00302* (2013.01); *G06N 3/0454* (2013.01); *G06N 20/00* (2019.01)

(56) References Cited

U.S. PATENT DOCUMENTS

| | | | | |
|---|---|---|---|---|
| 10,019,489 | B1* | 7/2018 | Adair | G06Q 30/0631 |
| 10,282,431 | B1* | 5/2019 | Bhotika | G06F 16/5838 |
| 10,657,718 | B1* | 5/2020 | Miranda | G06K 9/00302 |
| 2002/0178440 | A1 | 11/2002 | Agnihotri et al. | |
| 2004/0001616 | A1* | 1/2004 | Gutta | G06Q 30/02 |
| | | | | 382/118 |
| 2007/0172155 | A1* | 7/2007 | Guckenberger | G06F 16/583 |
| | | | | 382/305 |
| 2008/0065468 | A1* | 3/2008 | Berg | G06Q 30/02 |
| | | | | 705/7.32 |
| 2009/0299814 | A1* | 12/2009 | Grigsby | G06Q 30/02 |
| | | | | 705/7.29 |
| 2011/0112890 | A1 | 5/2011 | Chu et al. | |
| 2012/0016827 | A1 | 1/2012 | Evans et al. | |
| 2013/0132898 | A1 | 5/2013 | Cuento | |
| 2013/0198030 | A1* | 8/2013 | Linden | G06Q 30/0277 |
| | | | | 705/26.7 |
| 2014/0122231 | A1 | 5/2014 | Slutsky et al. | |
| 2014/0278998 | A1* | 9/2014 | Systrom | G06Q 30/0277 |
| | | | | 705/14.57 |
| 2014/0279039 | A1* | 9/2014 | Systrom | G06Q 30/0224 |
| | | | | 705/14.66 |
| 2014/0279068 | A1* | 9/2014 | Systrom | G06Q 30/0269 |
| | | | | 705/14.73 |
| 2014/0313129 | A1* | 10/2014 | Elvesjo | G06F 1/3265 |
| | | | | 345/156 |
| 2014/0363059 | A1* | 12/2014 | Hurewitz | G06Q 30/0201 |
| | | | | 382/118 |
| 2014/0365272 | A1 | 12/2014 | Hurewitz | |
| 2016/0015307 | A1* | 1/2016 | Kothuri | G06F 19/324 |
| | | | | 702/19 |
| 2016/0055236 | A1* | 2/2016 | Frank | G06Q 30/02 |
| | | | | 707/748 |
| 2016/0093081 | A1* | 3/2016 | Kim | G06F 3/167 |
| | | | | 345/156 |
| 2016/0110772 | A1* | 4/2016 | Herring | G06K 9/00255 |
| | | | | 705/14.66 |
| 2016/0117407 | A1 | 4/2016 | Cypher et al. | |
| 2016/0180447 | A1* | 6/2016 | Kamalie | G06Q 30/0643 |
| | | | | 705/27.2 |
| 2016/0224803 | A1* | 8/2016 | Frank | G06F 16/24578 |
| 2017/0011260 | A1* | 1/2017 | Mihara | G06Q 30/02 |
| 2017/0091844 | A1* | 3/2017 | Yarvis | G06Q 30/0631 |
| 2017/0270591 | A1* | 9/2017 | Matsubara | G06F 16/2282 |
| 2018/0047192 | A1* | 2/2018 | Kristal | G06Q 30/0643 |
| 2018/0075514 | A1* | 3/2018 | Madhvanath | G06Q 30/0631 |

FOREIGN PATENT DOCUMENTS

| | | |
|---|---|---|
| CN | 104699769 A | 6/2015 |
| JP | 2016-076109 A | 5/2016 |
| KR | 10-2003-0004447 A | 1/2003 |
| KR | 10-2005-0024401 A | 3/2005 |
| KR | 10-2014-0034367 A | 3/2014 |
| KR | 10-2015-0080090 A | 7/2015 |
| KR | 10-1629191 B1 | 6/2016 |
| WO | 02/39371 A2 | 5/2002 |

OTHER PUBLICATIONS

Di et al.; Style Finder: Fine-Grained Clothing Style Recognition and Retrieval; CVPR Workshop; 2013.

McAuley et al.; Image-based Recommendations on Styles and Substitutes; SIGIR; Jun. 17, 2015.

Veit et al.; Learning Visual Clothing Style with Heterogeneous Dyadic Co-occurrences; ICCV; 2015.

International Search Report with Written Opinion and English translation dated Jun. 21, 2018; International Appln. No. PCT/KR2018/001240.

Chinese Office Action dated Jul. 14, 2021, issued in Chinese Patent Application No. 201880008158.X.

* cited by examiner

DEVICE AND METHOD FOR RECOMMENDING PRODUCT

TECHNICAL FIELD

The present disclosure relates to a device and method for recommending products, and more particularly, to a device and method for recommending products to a user based on user's facial expression information with respect to a displayed product.

BACKGROUND ART

An artificial intelligence (AI) system is a computer system for implementing the human-level intelligence. Unlike existing rule-based smart systems, the AI system is a system in which machines learn, judge and become smart. As the AI system is used more, the recognition rate is improved, and user's taste is understood more accurately. Therefore, the existing rule-based smart systems are gradually being replaced by deep learning-based AI systems.

AI technology consists of machine learning and component technologies that utilize the machine learning (deep learning).

Machine learning is algorithm technology that classifies/learns the characteristics of input data by itself, and component technology is technology that simulates functions such as recognition and judgment of human brain by using machine learning algorithms such as deep learning. The component technology is composed of technical fields such as verbal comprehension, visual comprehension, reasoning/prediction, knowledge representation, motion control, and the like.

Various fields in which the AI technology is applied are as follows. Verbal comprehension is technology for recognizing and applying/processing human language/characters, and includes natural language processing, machine translation, a dialogue system, question and answer, voice recognition/synthesis, and the like. Visual comprehension is technology for recognizing and processing objects as human vision, and includes object recognition, object tracking, image search, human recognition, scene understanding, spatial understanding, image enhancement, and the like. Reasoning prediction is technology for judging and logically reasoning and predicting information, and includes knowledge/probability-based reasoning, optimization prediction, preference-based planning, recommendation, and the like. Knowledge representation is technology for automating human experience information into knowledge data, and includes knowledge building (data generation/classification) and knowledge management (data utilization). Motion control is technology for controlling the autonomous driving of a vehicle and the motion of a robot, and includes motion control (navigation, collision, driving), operator control (behavior control), and the like.

As the development of multimedia technology and network technology, a user is able to receive a variety of services using the device. In particular, as the face recognition technology has advanced, the user has been able to show their feelings through facial expressions and to execute the operation of the device according to user's facial expression information.

However, conventionally, there has been a problem that it is difficult to accurately identify user's feelings about a product from a user's facial expression, and even if the user's feelings are identified, it is difficult to recommend another product suitable for the user. Accordingly, technology for efficiently recommending a product to a user on the basis of the user's facial expression is required.

DESCRIPTION OF EMBODIMENTS

Technical Problem

One embodiment provides a device and method for selecting a product to recommend to a user from user's facial expression information using a trained model which is trained by using an artificial intelligence algorithm.

One embodiment provides a device and method for determining the user's satisfaction with a product from user's facial expression information and selecting a product to be recommended to a user based on the determined satisfaction.

In addition, one embodiment provides a device and method for selecting a product to be recommended to a user based on a user's satisfaction with the product and a similarity between a plurality of product sets.

Furthermore, one embodiment provides a device and method for selecting a product to be recommended to a user based on a user's satisfaction with the product and purchase history information of other users who purchased the product.

Solution to Problem

As a technical device for achieving the above-mentioned technical problem, one embodiment may provide a device including: a display; a camera for photographing a user; a memory storing at least one program; and at least one processor for recommending a product based on user's facial expression information by executing at least one program, wherein the at least one program includes: obtaining user's facial expression information for a displayed product; determining the user's satisfaction with the displayed product based on the obtained user's facial expression information; selecting a product set to be recommended to the user from among a plurality of product sets based on the determined user's satisfaction; and displaying at least one product included in the selected product set, wherein the determining of the user's satisfaction includes determining satisfaction from the facial expression information using a trained model which is trained by using an artificial intelligence algorithm.

BEST MODE

Figure 1:
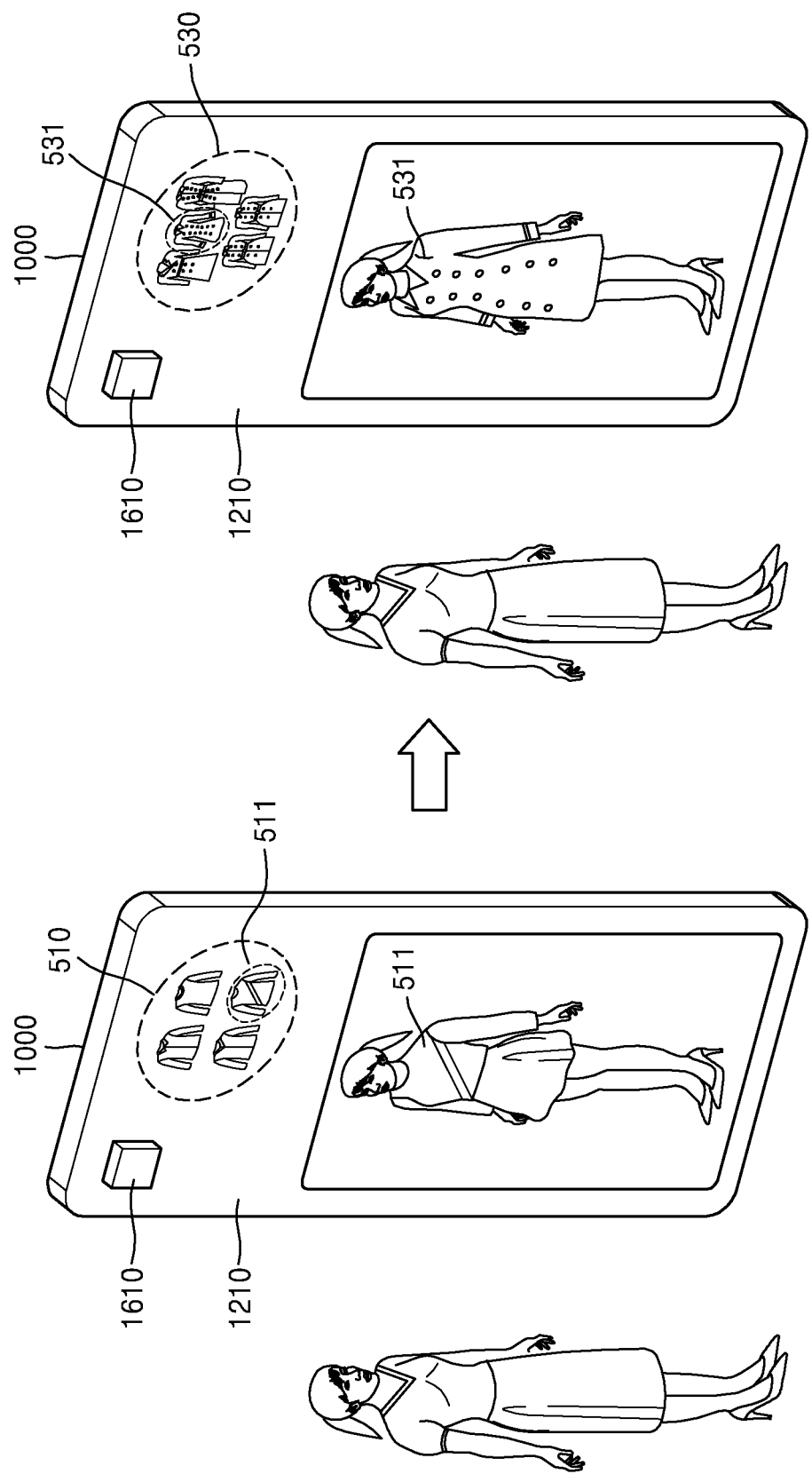
FIG. 1 is a view of an example in which a device 1000 according to an embodiment obtains information about a user's emotional state and recommends a product.

As a technical device for achieving the above-mentioned technical problem, the first aspect of the present disclosure may provide a device including: a display; a camera for photographing a user; a memory storing at least one program; and at least one processor for recommending a product based on user's facial expression information by executing at least one program, wherein the at least one program includes: obtaining user's facial expression information for a displayed product; determining the user's satisfaction with the displayed product based on the obtained user's facial expression information; selecting a product set to be recommended to the user from among a plurality of product sets based on the determined user's satisfaction; and displaying at least one product included in the selected product set, wherein the determining of the user's satisfaction includes determining satisfaction from the facial expression information using a trained model which is trained by using an artificial intelligence algorithm.

Furthermore, the second aspect of the present disclosure may provide a method, performed by a device, of recommending a product, the method including: displaying a product selected by a user; obtaining user's facial expression information about the displayed product; determining the user's satisfaction with the displayed product based on the obtained user's facial expression information; selecting a product set to be recommended to the user from among a plurality of product sets based on the determined user's satisfaction; and displaying at least one product included in the selected product set, wherein the device determines satisfaction from the facial expression information using a trained model which is trained by using an artificial intelligence algorithm.

Furthermore, the third aspect of the present disclosure may provide a non-transitory computer-readable recording medium having recorded thereon a program for executing the method of the second aspect.

In an embodiment, the method may be characterized in that related information includes at least one of the user's sex, the user's height, the user's weight, the user's age, the user's purchase history, the user's occupation, the user's clothing, and the user's income.

In an embodiment, the method may be characterized in that the operation information includes information about at least one of gesture of the user's, a gaze direction of the user's, and the duration that a user views a displayed product.

In an embodiment, the method may include selecting a product set to be recommended based on purchase history information of other users for the displayed product.

In an embodiment, the method may further include displaying a GUI for determining whether to purchase the displayed product based on determined user's satisfaction.

MODE OF DISCLOSURE

Reference will now be made in detail to embodiments of the present disclosure, examples of which are illustrated in the accompanying drawings. In this regard, the present disclosure may have different forms and should not be construed as being limited to the descriptions set forth herein. In addition, descriptions of well-known functions and constructions will be omitted for clarity and conciseness, and similar reference numerals are assigned to similar elements throughout the specification.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicates.

Hereinafter, the present disclosure will be described in detail with reference to the accompanying drawings.

FIG. 1 is a view of an example in which a device 1000 according to an embodiment obtains information about a user's emotional state and recommends a product.

Referring to FIG. 1, the device 1000 may obtain information about a user's emotional state for a product set 510 or a displayed product 511 and may determine the user's satisfaction based on the obtained emotional information. The device 1000 may select a product set 530 to be recommended to a user based on the determined user's satisfaction. The device 1000 may also select the third product set 530 to be recommended to a user based on a similarity between a plurality of product sets or purchase history information of other users. In addition, the device 1000 may recommend a product set or a product in the product set.

The information about the user's emotional state may be information about a user's emotional state for the product 511 displayed on the device 1000. The user's emotional state may include, but is not limited to, anger, sadness, surprise, joy, happiness, and the like.

The device 1000 may also obtain the information about a user's emotional state from user's facial expression information, user's voice information, or operation information. For example, the device 1000 may obtain user's facial expression information about the displayed product 511 using a camera 1610, and may obtain information about a user's emotional state about the product 511 based on a user's emotional state shown in the user's facial expression information. In addition, the device 1000 may obtain user's voice information about the displayed product 511 using a microphone 1620, and may obtain information about a user's emotional state about the product 511 based on a user's emotional state included in the obtained voice information. Also, the device 1000 may obtain operation information about the displayed product 511 using the camera 1610, and may obtain information about a user's emotional state about the product 511 based on a user's emotional state shown in the obtained operation information.

The device 1000 may be, but is not limited to, digital signage, as shown in FIG. 1, and may include any type of device, including display 1210a and a camera 1610. For example, the device 1000 may be, but is not limited to, a smartphone, a tablet personal computer (PC), a PC, a smart television (TV), a mobile phone, a personal digital assistant (PDA), a laptop computer, a media player, a micro-server, a global positioning system (GPS) device, an electronic book terminal, a terminal for digital broadcasting, a navigation device, a kiosk, an MP3 player, a digital camera, a household appliance, and other mobile or non-mobile computing device. Also, the device 1000 may be, but is not limited to, a wearable device such as a watch, glasses, a hair band, or a ring that has a communication function and a data processing function.

Figure 2:
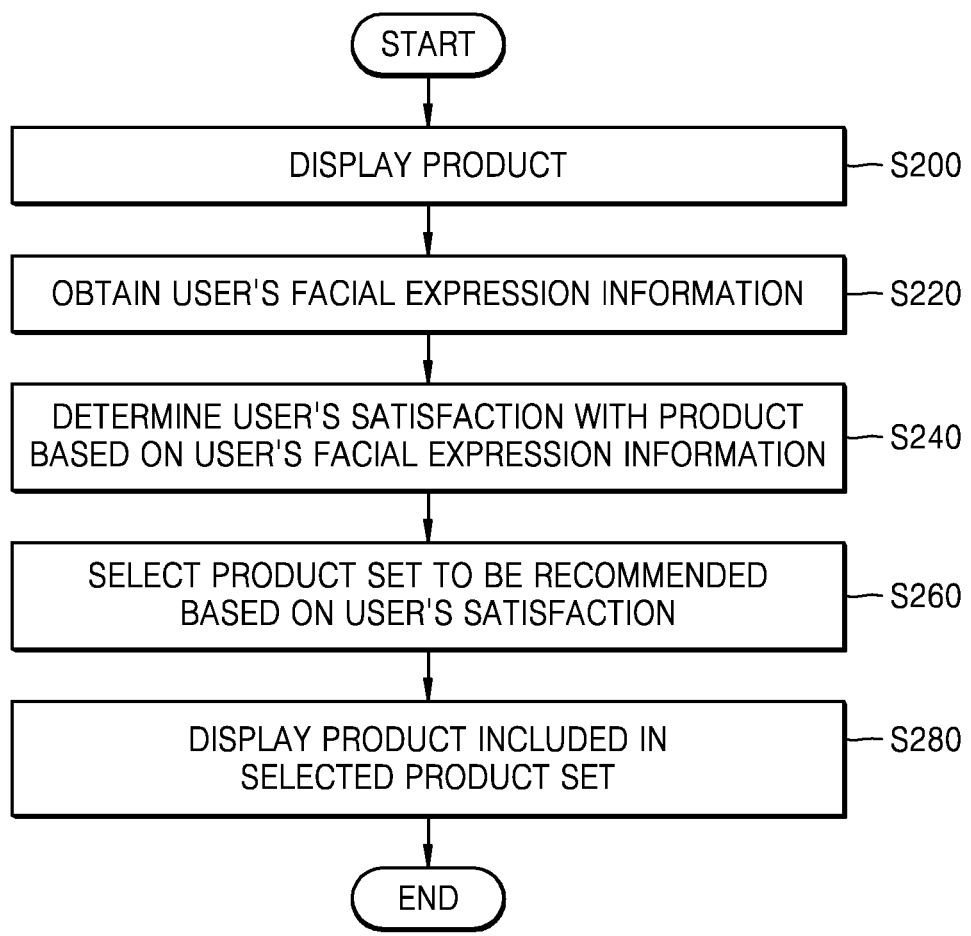
FIG. 2 is a flowchart of a method, performed by the device 1000, of recommending a product based on user's facial expression information, according to an embodiment.

FIG. 2 is a flowchart of a method, performed by the device 1000, of recommending a product based on user's facial expression information, according to an embodiment.

Referring to FIG. 2, in operation S200, the device 1000 may display a product. In an embodiment, the device 1000 may display one of products included in a product set, and may display the products included in the product set one by one at certain time intervals according to a predetermined order.

In addition, the device 1000 may display a product having the highest sales volume from among products stored in the device 1000 or a server, or may display a product that a user has most recently searched for.

In an embodiment, the device 1000 may display a product selected by a user. The device 1000 may display the selected product in response to input of the user selecting one product. The user may select a product by touching, for example, the display 1210 provided in the device 1000, and may recognize an identification display (e.g., a barcode, an product identification code, an electronic product code, etc.) included in the product in advance on an identification display recognition device provided in the device 1000 and select the product.

The device 1000 may display not only a product but also a product set including the displayed product together with the product. For example, the device 1000 may display the product set at a portion of an upper end or a lower end of the display 1210, and may display the product set at a right portion or a left portion. However, a display of a product or a display of a product set is not limited thereto, and the product or the product set may be variously displayed according to a configuration, location, and size set in advance in the device 1000 or the server.

In operation S220, the device 1000 may obtain user's facial expression information about the displayed product.

In an embodiment, the device 1000 may include the camera 1610 capable of photographing a user's face image using the device 1000. The device 1000 may obtain the user's face image by using the camera 1610 and may obtain user's facial expression information from the obtained user's face image. The obtained user's face image may be a still image or a moving image.

The user's facial expression information may be obtained from a face image of a user viewing a product displayed on the device 1000 as information representing a facial expression of the user. Also, a user's psychological state with respect to the displayed product may be reflected on a user's face, and facial expression information may be obtained from a user's face image reflecting the user's psychological state. The device 1000 may obtain information about a user's emotional state about the displayed product based on the obtained user's facial expression information.

Which facial expression information the user's face image represents may be determined according to learning based on a preset criterion. The device 1000 may quickly and accurately determine the user's facial expression information from the user's face image.

In operation S240, the device 1000 may determine the user's satisfaction with the displayed product based on the obtained user's facial expression information.

The device 1000 may determine the user's satisfaction with the displayed product from the user's facial expression information by using a trained model which is trained using an artificial intelligence algorithm. For example, the device 1000 may determine the user's satisfaction from the facial expression information by using the trained model which is trained using at least one of machine learning, a neural network, genes, deep learning, and a classification algorithm as the artificial intelligence algorithm.

In an embodiment, the device 1000 may obtain information about a user's emotional state about the displayed product from the user's facial expression information. The device 1000 may determine a user's emotional state corresponding to the obtained facial expression information. For example, when the device 1000 obtains facial expression information indicating happiness, the user's emotional state may be determined to be happy.

In addition, the device 1000 may determine the user's satisfaction with the displayed product based on the obtained user's emotional state.

For example, the device 1000 may determine the user's emotional state as 'joyful' from the obtained user's facial expression information, and in this case, may determine that the user's satisfaction with the displayed product is high. Alternatively, the device 1000 may determine the user's emotional state to be 'angry' from the obtained user's facial expression information, and in this case, may determine that the user's satisfaction with the displayed product is low.

The device 1000 may previously store information about the user's satisfaction corresponding to the user's emotional state in the device 1000 or the server.

Which emotional state the user's facial expression information represents may be determined according to learning based on a preset criterion. Further, the degree of satisfaction of the user's emotional state may also be determined according to the learning based on a preset criterion. The device 1000, from the user's facial expression information, may quickly and accurately determine an emotional state that a user feels about the displayed product. In addition, the device 1000 may determine clearly and finely how much the user's emotional state represents a degree of satisfaction with the displayed product In operation S260, the device 1000 may select a product set to be recommended to a user from among a plurality of product sets based on the determined user's satisfaction. In an embodiment, the device 1000 may recommend a different product to the user in consideration of the user's satisfaction with the displayed product.

The device 1000 may select a product set to be recommended to a user from the user's satisfaction with the displayed product by using a trained model which is trained using the artificial intelligence algorithm.

For example, when the user's satisfaction with the displayed product is high, the device 1000 may select a product set including products similar to the displayed product.

When the user's satisfaction with the displayed product is low, the device 1000 may select a product set including products that are not similar to the displayed product.

A selection of a product set depending on the user's satisfaction may be determined according to learning based on a preset criterion. The device 1000 may accurately select a product set that the user prefers more than the displayed product based on the user's satisfaction. The device 1000 may quickly and accurately recommend a product set that a user may prefer more than the displayed product.

In the above description, the obtainment of the user's emotional state, the determination of the user's satisfaction, and the selection of the product set to be recommended to a user have been described as being performed based on separate learning, respectively, but are not limited thereto. At least two of the obtainment of the user's emotional state, the determination of the user's satisfaction, and the selection of the product set to be recommended to a user may be performed by one trained model.

Furthermore, for example, the obtainment of the user's emotional state, the determination of the user's satisfaction, and the selection of the product set to be recommended to a user may be performed based on learning according to Deep Neural Network technology.

In operation S280, the device 1000 may display a selected product set or at least one product included in the selected product set.

In an embodiment, the device 1000 may display a preset product with the highest priority from among a plurality of products included in the selected product set. The priority among the plurality of products may be set in advance based on product sales volume, reviews of other users, and the like.

In an embodiment, the device 1000 may display the most recently included product among products included in the selected product set, or may display the lowest priced product or the highest priced product.

In an embodiment, the device 1000 may display one of products included in a product set, or may display the products included in the product set at certain time intervals according to a predetermined order.

Figure 3A:
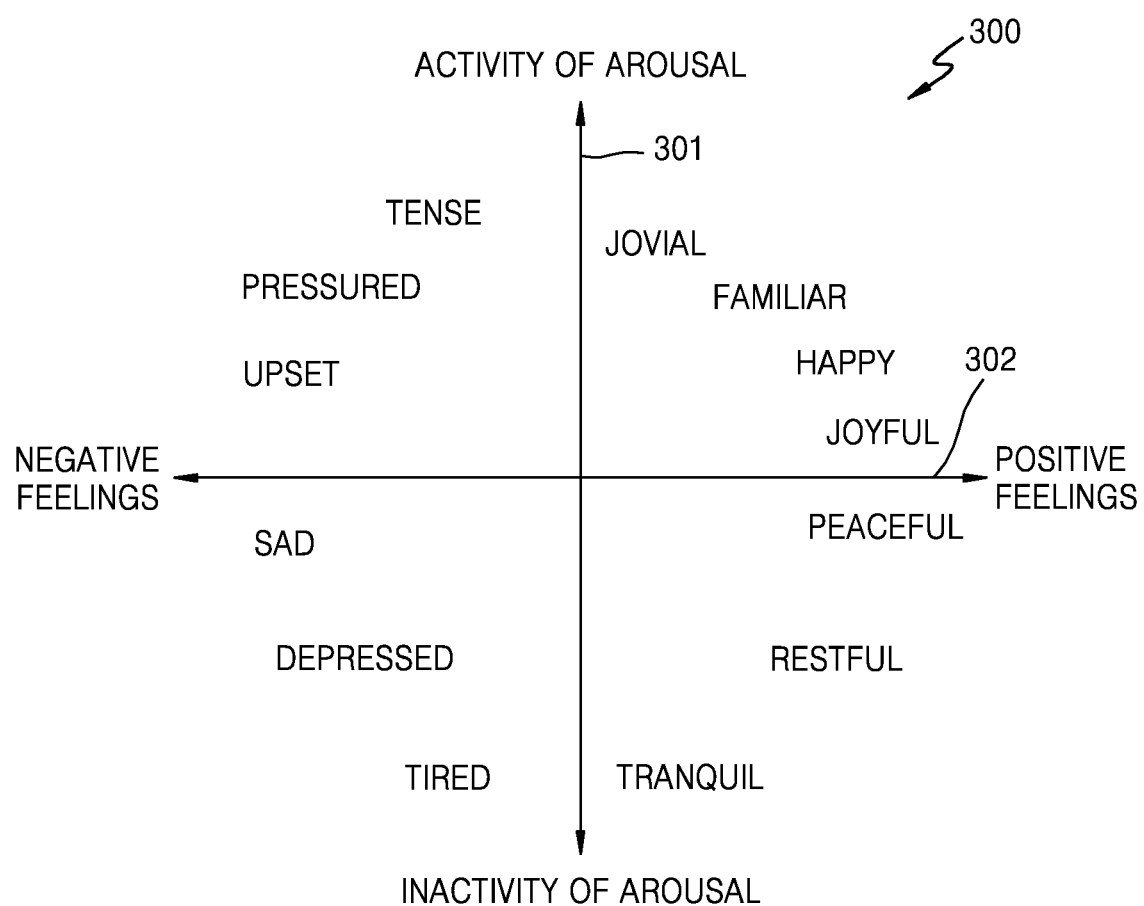
FIGS. 3A and 3B are views of an example in which the device 1000 according to an embodiment determines satisfaction based on user's facial expression information.
Figure 3B:
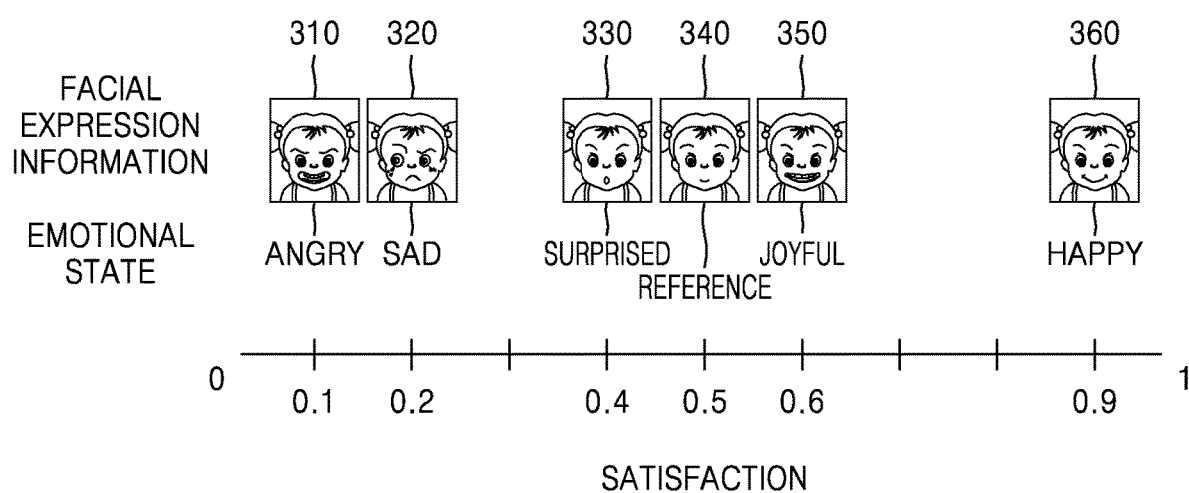

FIGS. 3A and 3B are views of an example in which the device 1000 according to an embodiment determines satisfaction based on user's facial expression information.

Referring to FIGS. 3A and 3B, the device 1000 may obtain user's facial expression information from a user's face image and may obtain a user's emotional state from the obtained user's facial expression information.

Referring to FIG. 3A, in an embodiment, the device 1000 may obtain the user's emotional state by matching the user's face image with a graph 300 for preset user's emotional states.

Referring to the graph 300 for the user's emotional states may be a graph that analyzes and displays user's emotions based on a degree of activity of arousal 301 and a positive degree of emotion 302. On the graph 300 for the user's emotional states, the user's emotional states may be displayed continuously based on the degree of activity of arousal 301 and the positive degree of emotion 302.

For example, the device 1000 may obtain a user's emotional state by matching a user's facial expression with the preset graph 300. The obtained user's emotional state may correspond to an emotional state such as 'joyful', 'happy', or 'sad' shown in the graph 300.

However, the obtained user's emotional state may be an emotional state located among the emotional states predefined or shown in the graph 300. The user's emotional state may correspond to one of the emotional states continuously displayed on the graph 300. The user's emotional state may be displayed as one point on the graph 300, and the device 1000 may obtain the user's emotional state based on a coordinate value of the corresponding point.

Referring to FIG. 3B, in another embodiment, the device 1000 may obtain user's facial expression information 310 to 360 based on the degree of change of the user's face image.

The device 1000 may obtain a user's reference face image, which is a user's face image before displaying a product. In addition, the device 1000 may obtain a user's changed face image, which is a user's face image after displaying a product. The device 1000 may obtain the user's facial expression information 310 to 360 by comparing the obtained user's reference face image with the user's changed face image.

The device 1000 may obtain changes in a face image such as a change in a pupil shape, a change in an eye shape, a change in an eyebrow shape, a change in a mouth shape, and a change in a cheekbone position by comparing the user's reference face image with the user's changed face image. The device 1000 may obtain the user's facial expression information 310 to 360 by matching the degree of change of the obtained user's face image with facial expression information preset in the device 1000 or a server.

In another embodiment, the device 1000 may extract keypoints from the user's changed face image to obtain the user's facial expression information 310 to 360.

The keypoints move largely according to a user's facial expression change, but may be distributed mainly to the eyes, eyebrows, mouth, and cheekbones which are easy to identify even if the user's expression changes. The device 1000 may obtain the user's facial expression information 310 to 360 by matching the keypoints extracted from the user's changed face image with keypoints of the facial expression information preset in the device 1000 or the server.

The preset facial expression information may be information about human facial expressions classified by a certain criterion. For example, the preset facial expression information may include, but is not limited to, an image of a face according to the facial expression information, a degree of change of a face corresponding to the facial expression information, information about a keypoint corresponding to the facial expression information, and the like.

In an embodiment, the device 1000 may determine a preset emotional state corresponding to the obtained user's facial expression information 310 to 360 as a user's emotional state. For example, when the device 1000 obtains the user's facial expression information 360 indicating happiness from the user's face image, the user's emotional state may be determined to be happy.

For example, the user's emotional state represented by the user's facial expression information 310 to 360 may include, but is not limited to, anger, sadness, surprise, joy, happiness, and the like. A user's reference emotional state may be an emotional state represented by the facial expression information before a user views a displayed product.

The device 1000 may determine the user's satisfaction with the displayed product based on the obtained user's emotional state. In an embodiment, the device 1000 may quantify the satisfaction corresponding to the user's emotional state.

Referring to FIG. 3B, for example, the device 1000 may determine the user's satisfaction as a number between 0 and 1 based on the user's facial expression information 310 to 360, but is not limited thereto. The greater the user's satisfaction for the displayed product, the higher the user's satisfaction may be quantified.

For example, when the user's emotional state is determined to be anger, the device 1000 may quantify the user's satisfaction to 0.1. When the user's emotional state is determined to be sad, the device 1000 may quantify the user's satisfaction to 0.2.

Meanwhile, when the user's emotional state is determined to be joy, the device 1000 may quantify the user's satisfaction to 0.6, and when the user's emotional state is determined to be happy, the device 1000 may quantify the user's satisfaction to 0.9.

A correspondence relationship between the user's facial expression information 310 to 360 or the user's emotional state and the user's satisfaction may be set in advance in the device 1000 or the server. The correspondence relationship may be set differently for each user.

Which emotional state the user's facial expression information represents may be determined according to learning using an artificial intelligence algorithm. Alternatively, which emotional state the user's facial expression information represents may be determined according to learning based on preset criterion. Further, the degree of satisfaction of the user's emotional state may also be determined according to the learning based on the preset criterion.

In an embodiment, the device 1000 may obtain information about the face, facial expression, voice, and operation of a person. In addition, the device 1000 may obtain face image data.

Further, the device 1000 may learn a criterion on how to obtain the facial expression information based on user's image data. The device 1000 may also learn a criterion on how to determine the user's emotional state based on the user's facial expression information or the operation information.

The device 1000 may obtain user's face image data using a camera. The device 1000 may analyze the obtained user's face image to provide a recognition result.

In an embodiment, the device 1000 may provide a recognition result of a user's facial expression included in the obtained user's face image. The recognition result of the user's face image may be, for example, a user's emotional state, user's satisfaction, related information, and the like.

Figure 4:
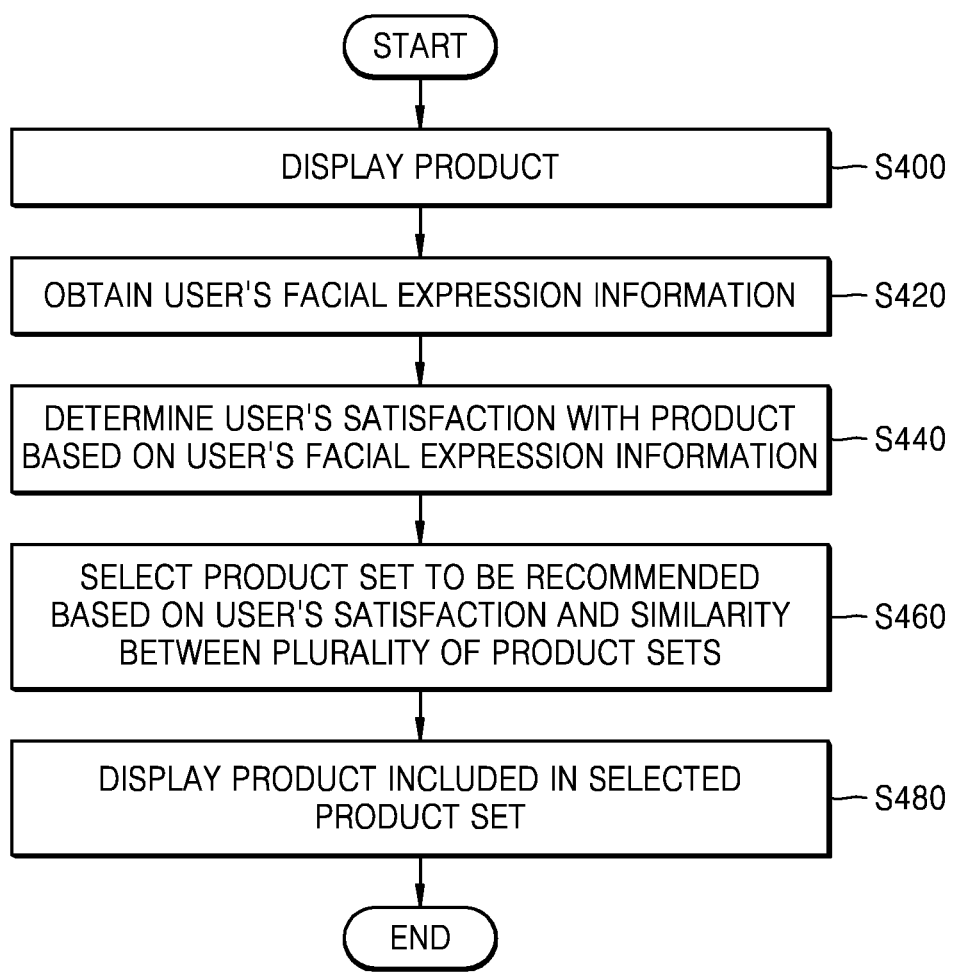
FIG. 4 is a flowchart of a method, performed by the device 1000, of recommending a product based on a user's satisfaction and a similarity between product sets, according to an embodiment.

FIG. 4 is a flowchart of a method, performed by the device 1000, of recommending a product based on a user's satisfaction and a similarity between product sets, according to an embodiment.

Referring to FIG. 4, in operation S400, the device 1000 may display a product. In operation S420, the device 1000 may obtain user's facial expression information about the displayed product. In operation S440, the device 1000 may determine the user's satisfaction with the displayed product based on the user's facial expression information.

Operations S400 to S440 of FIG. 4 correspond to operations S200 to S240 of FIG. 2, respectively, and thus a detailed description thereof will not be given herein.

In operation S460, the device 1000 may select a product set to be recommended to a user based on the user's satisfaction with the displayed product, and a similarity between a set including the displayed product and a plurality of product sets.

In an embodiment, the similarity between the plurality of product sets may be set in advance in the device 1000 or the server. For example, a similarity between long-sleeved cotton shirts set and long-sleeved linen shirts set may be high, and a similarity between long-sleeved cotton shirts set and long cotton pants set may be low.

In an embodiment, the device 1000 may determine a similarity corresponding to the user's satisfaction with the displayed product. The device 1000 may recommend to the user a product set having a determined degree of similarity with a product set including the displayed product. For example, the device 1000 may select a product set having a higher degree of similarity with the product set including the displayed product as user's satisfaction increases, and may select a product set having a lower degree of similarity with the product set including the displayed product as the user's satisfaction decreases.

The selection of a product set according to user's satisfaction and a similarity between the product sets may be determined according to learning based on a preset criterion.

The device 1000 may accurately recommend a product that a user may prefer more than the displayed product based on the satisfaction and the similarity between the product sets. In addition, the device 1000 may recommend an appropriate product to a user based on the user's satisfaction and the similarity between the product sets without the help of a clerk.

In operation 480, the device 1000 may display a selected product set or at least one product included in the selected product set. Operation S480 of FIG. 4 corresponds to operation S280 of FIG. 2, and thus a detailed description thereof will not be given herein.

Figure 5A:
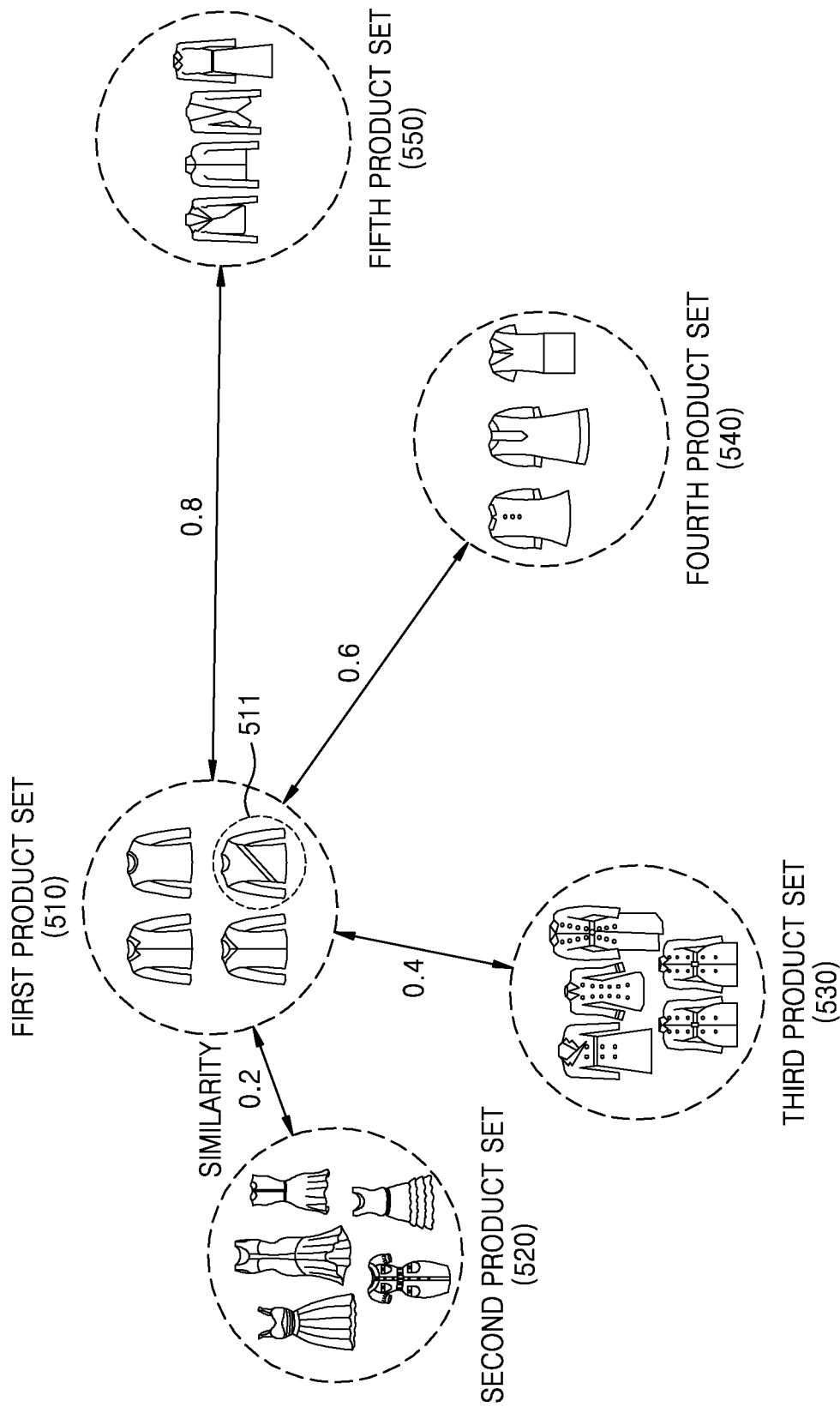
FIGS. 5A and 5B are views of an example in which the device 1000 according to an embodiment recommends a product set based on a user's satisfaction and a similarity between product sets.
Figure 5B:
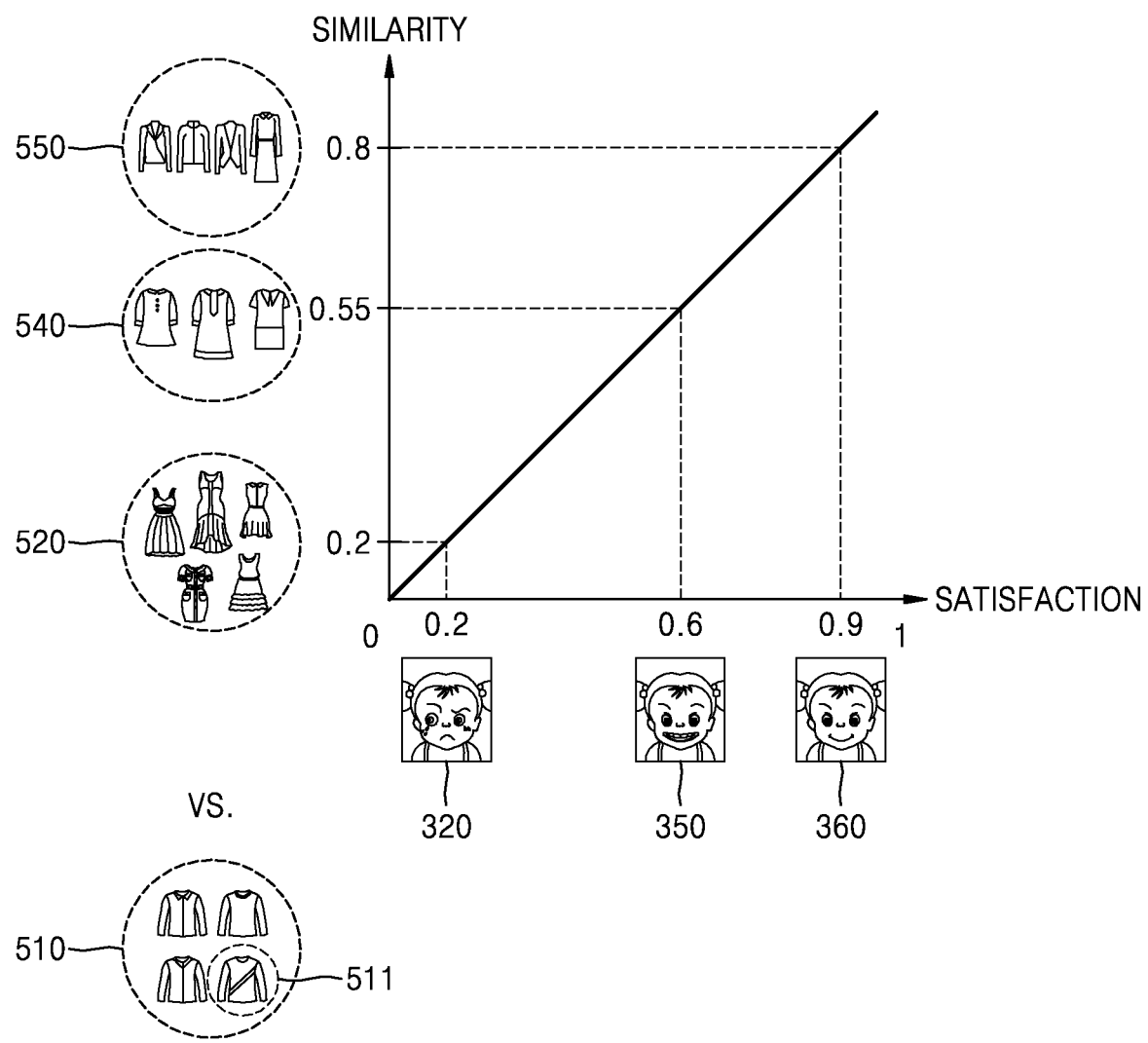

FIGS. 5A and 5B are views of an example in which the device 1000 according to an embodiment recommends a product set based on a user's satisfaction and a similarity between product sets.

Referring to FIG. 5A, the product set may be a set that includes products in which a plurality of parameters such as a design, material, color, a wearer's body part, a wearing season, etc. are defined at the same or the same level.

For example, the first product set 510 may be a set of products having parameters such as jean material, top clothes, a long-sleeved design, a basic length, outerwear, spring or autumn wear. Furthermore, the third product set 530 may be a set of products having parameters such as cotton material, top clothes, a long-sleeved design, a long length, outerwear, spring or autumn wear.

A similarity between the two product sets may be determined by the same degree of the parameters of products included in the two product sets. For example, a similarity between two product sets having the same 10 parameters may be greater than a similarity between two product sets having the same two parameters.

A similarity between a plurality of product sets may be quantified. For example, a similarity between a plurality of product sets may be quantified by a number between 0 and 1, but is not limited thereto. The greater the number of identical parameters among product sets, the greater the similarity between the product sets may be quantified.

In an embodiment, each of a pair of product sets may be set to have a different degree of similarity. A similarity between a pair of the first product set 510 and a second product set 520 may be 0.2 and a similarity between a pair of the first product set 510 and the fourth product set 540 may be 0.6. In addition, a similarity between a pair of the first product set 510 and a fifth product set 550 may be 0.8.

The similarity between a pair of product sets may be set in advance in the device 1000 or the server.

The similarity between product sets may be changed based on a user's satisfaction.

In an embodiment, a new product may be added to a product set based on the user's satisfaction, and a product included in the product set may be removed from the product set. For example, when the user's satisfaction with one product among products included in the product set is less than a preset threshold value in comparison with satisfaction with other products excluding the one product, the one product may be removed from the product set.

In an embodiment, the similarity between product sets may be changed based on the user's satisfaction.

For example, when the user's satisfaction for the displayed product 511 is 0.8, the device 1000 may select the fifth product set 550 as a product set to be recommended to a user. When the user's satisfaction for the fifth product set 550 selected by the device 1000 is less than a preset threshold, a similarity between the first product set 510 and the fifth product set 550 may be changed to a value less than 0.8.

Referring to FIG. 5B, the device 1000 may select a product set to be recommended to a user based on a user's satisfaction and a similarity between the first product set 510 including the displayed product 511 and a plurality of product sets not including the displayed product.

The device 1000 may determine a similarity corresponding to the user's satisfaction. The device 1000 may select a product set to be recommended by using a determined degree of similarity and a similarity set in advance between a product set including the displayed product and a plurality of product sets not including the displayed product.

In an embodiment, the device 1000 may display the product 511 of the first product set 510. The device 1000 may obtain user's facial expression information with respect to the displayed product 511.

When an emotional state obtained from user's facial expression information 320 for the displayed product 511 is sad, user's satisfaction with the displayed product 511 may be determined to be 0.2. A similarity corresponding to the user's satisfaction of 0.2 may be 0.2. A product set similar to 0.2 as the first product set 510 may be the second product set 520. The device 1000 may recommend the second product set 520 to a user who has a sad expression on the displayed product 511.

When an emotional state obtained from user's facial expression information 360 for the displayed product 511 is happy, user's satisfaction with the displayed product 511 may be determined to be 0.9. A similarity corresponding to the user's satisfaction of 0.9 may be 0.8. A product set similar to 0.8 as the first product set 510 may be the fifth product set 550. The device 1000 may recommend the fifth product set 550 to a user who has a happy expression on the displayed product 511.

In another embodiment, when there is no pair of the product set having the determined product to the product set including the displayed product, the device 1000 may select a product set having a similarity closest to a determined degree of similarity.

For example, when an emotional state obtained from user's facial expression information 350 for the displayed product 511 is joy, user's satisfaction with the displayed product 511 may be determined to be 0.6. A similarity corresponding to the user's satisfaction of 0.6 may be 0.55. In this case, there may be no product set similar to 0.55 as the first product set 510. The device 1000 may recommend the fourth product set 540 having a similarity 0.6 closest to a determined degree of similarity 0.55 to a user who has a happy expression for the displayed product 511.

Figure 6:
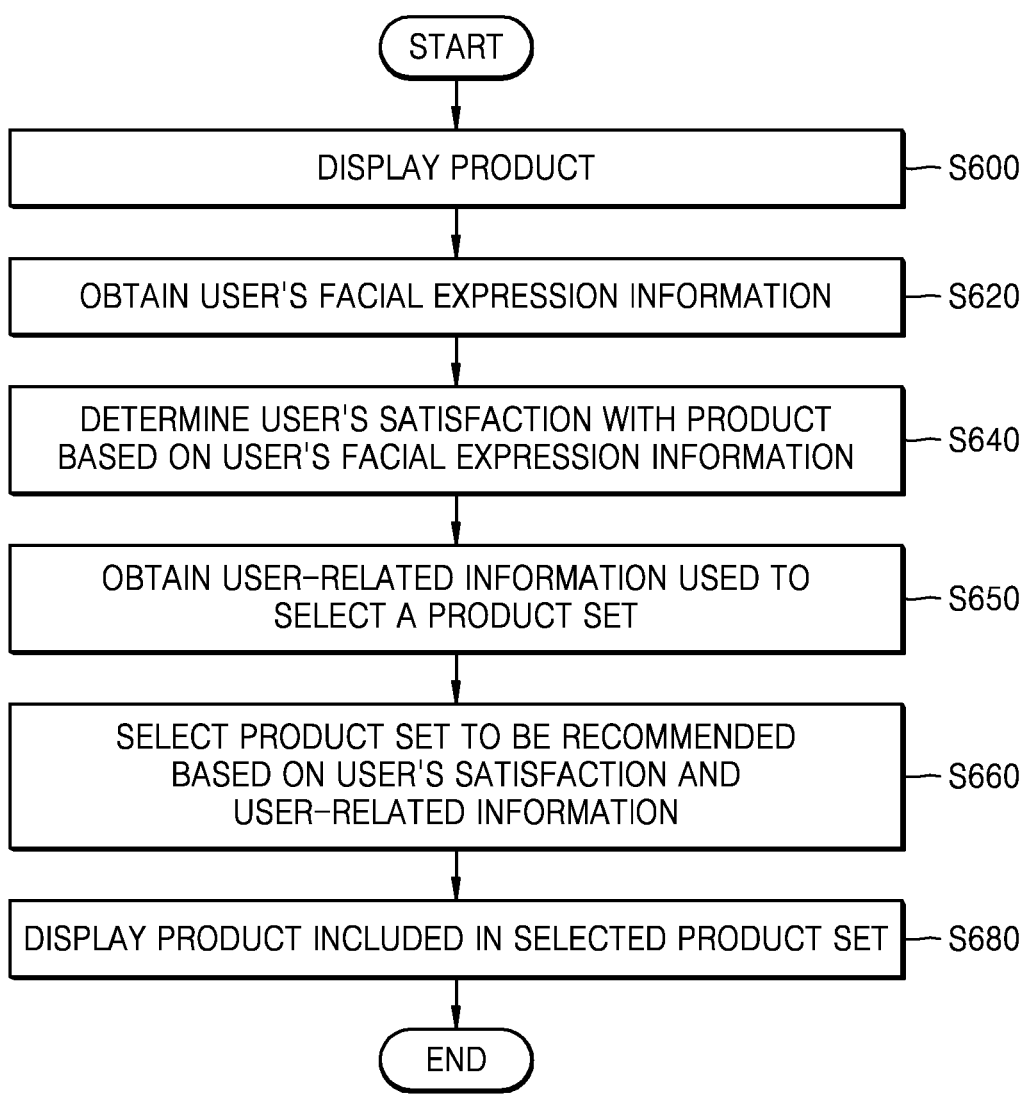
FIG. 6 is a flowchart of a method, by the device 1000, of recommending a product based on a user's satisfaction and related information according to an embodiment.

FIG. 6 is a flowchart of a method, performed by the device 1000, of recommending a product based on a user's satisfaction and related information according to an embodiment.

Referring to FIG. 6, in operation S600, the device 1000 may display a product. In operation S620, the device 1000 may obtain user's facial expression information about the displayed product. In operation S640, the device 1000 may determine the user's satisfaction with the displayed product based on the user's facial expression information.

Operations S600 to S640 correspond to operations S200 to S240 of FIG. 2, respectively, and thus a detailed description thereof will not be given herein.

In operation S650, the device 1000 may obtain related information used to select a product set.

The related information may include information about at least one of a user's sex, a user's height, a user's weight, a user's age, a user's purchase history, a user's occupation, user's clothing, and user's income.

The device 1000 may obtain the related information through the camera 1610 or may obtain the related information through a user input unit 1100 or a touch screen.

In addition, the device 1000 may receive identification information from a user and may obtain the related information stored in the device 1000 or a server by using the received identification information.

In operation S660, the device 1000 may select a product set to be recommended to a user based on the user's satisfaction with the displayed product and the related information.

In an embodiment, the device 1000 may preferentially select product sets to be recommended to a user from a plurality of product sets based on the obtained related information.

The device 1000 may analyze information related to other users who have purchased a product included in a product set. The device 1000 may classify and store the information related to other users who have purchased the product by product set. The device 1000 may compare the obtained related information with information related to other purchasers stored in advance by product set, and may determine whether to include the product sets in an object to be recommended to a user.

The device 1000 may select only product sets in which the number of related information that is the same as the obtained related information is greater than or equal to a threshold value, as a product set to be recommended. Meanwhile, the device 1000 may exclude product sets in which the number of related information that is different from the related information is greater than or equal to a threshold value, from the product set to be recommended.

For example, most of products included in a product set A are purchased by female office workers in their 20s, most of products included in a product set B are purchased by female office workers in their 30s, most of products included in a product set C are purchased by male athletes in their 20s, most of products included in a product set D are purchased by male office workers in their 20s, and most of products included in a product set E are purchased by male office workers in their 30s.

The device 1000 may select only the product set B and the product set E having two or more pieces of related information that are the same as the related information as an object to be recommended when the user is an office worker in 30s. In addition, the device 1000 may exclude the product set A, the product set B, and the product set D having two or more pieces of related information that are different from the related information, from the object to be recommended, when the user is a male athlete in 30s.

In an embodiment, the device 1000 may select a product set to be recommended based on the user's satisfaction, among product sets to be recommended to which the related information is reflected. The degree of reflection of the related information for selecting a product set to be recommended may be adjusted by using a threshold value. The threshold value may be reset by a user.

The selection of a product set according to the user's satisfaction and the related information may be determined according to learning based on a preset criterion. The device 1000 may recommend a product quickly and accurately based on the user's satisfaction and the related information.

In operation 680, the device 1000 may display a selected product set or at least one product included in the selected product set. Operation S680 of FIG. 6 corresponds to operation S280 of FIG. 2, and thus a detailed description thereof will not be given herein.

Figure 7:
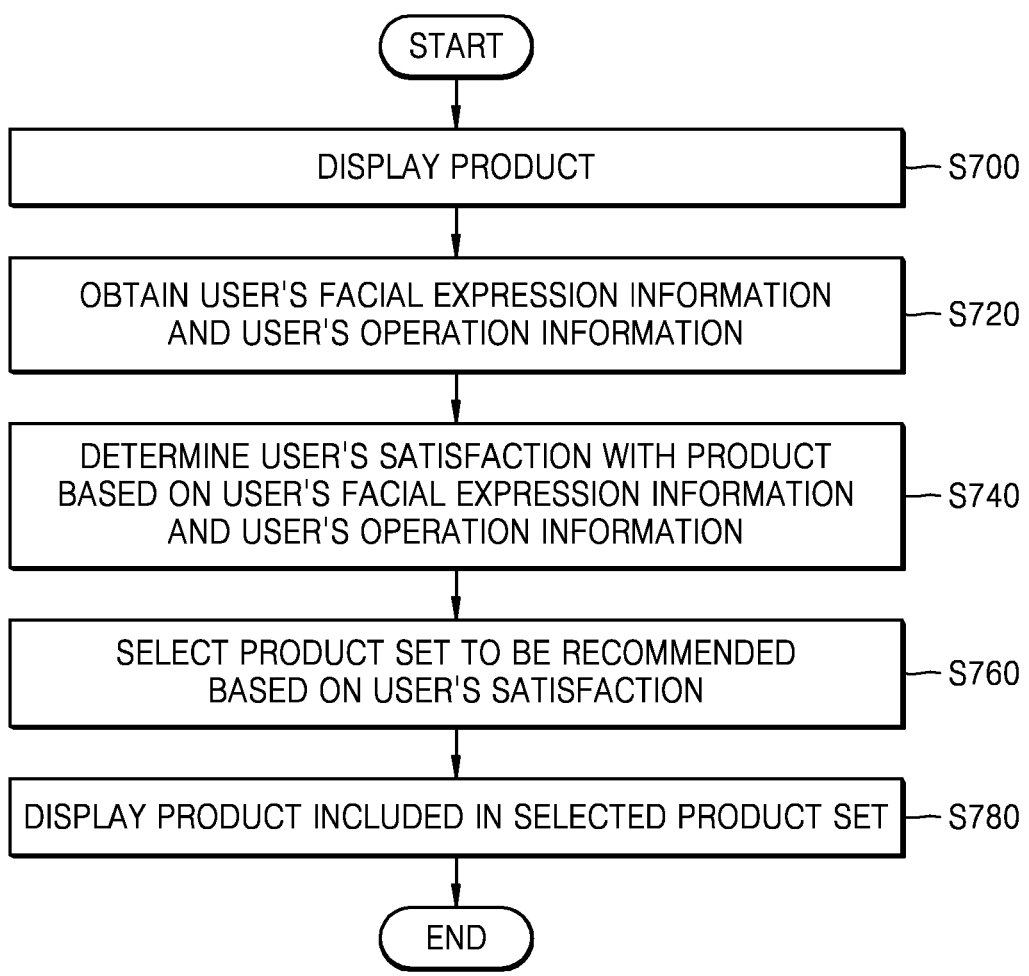
FIG. 7 is a flowchart of a method, performed by the device 1000, of recommending a product based on facial expression information and operation information, according to an embodiment.

FIG. 7 is a flowchart of a method, performed by the device 1000, of recommending a product based on facial expression information and operation information, according to an embodiment.

Referring to FIG. 7, in operation S700, the device 1000 may display a product. Operation S700 of FIG. 7 corresponds to operation S200 of FIG. 2, and thus a detailed description thereof will not be given herein.

In operation S720, the device 1000 may obtain user's facial expression information and operation information about the displayed product.

In an embodiment, the device 1000 may include the camera 1610 capable of photographing a user's body using the device 1000. The device 1000 may obtain a user's body image by using the camera 1610 and may obtain user's facial expression information and operation information from the obtained user's body image. The obtained user's body image may be a still image or a moving image.

The operation information may include information about at least one of gesture of the user's, a gaze direction of the user's, and the duration that a user views a displayed product. The device 1000 may obtain information about a user's emotional state about the displayed product from the obtained operation information.

Which facial expression information or which operation information the user's body image represents may be determined according to learning based on a preset criterion.

In operation S740, the device 1000 may determine the user's satisfaction with the displayed product based on the user's facial expression information and the operation information.

In an embodiment, the device 1000 may obtain information about a user's emotional state about the displayed product from the user's facial expression information and the operation information. The device 1000 may determine a user's emotional state corresponding to both the obtained facial expression information and operation information. The device 1000 may determine the user's satisfaction with the displayed product based on the obtained user's emotional state.

In another embodiment, the device 1000 may determine the user's satisfaction with the displayed product by summing satisfaction determined based on the facial expression information and satisfaction determined based on the operation information at a preset ratio. For example, the device 1000 may determine the user's satisfaction by summing a value obtained by multiplying the satisfaction determined based on the facial expression information by 0.5 and a value obtained by multiplying the satisfaction determined based on the operation information by 0.5.

Which emotional state the user's facial expression information and the operation information represents may be determined according to learning based on a preset criterion. Further, the degree of satisfaction of the user's emotional state may also be determined according to the learning based on the preset criterion.

The device 1000 may suitably recommend a product that a user desires to purchase based on the user's facial expression information and the operation information. The device 1000 may obtain the user's emotional state from a user's image in detail and may accurately recommend a product with higher user's satisfaction than the displayed product.

In operation S760, the device 1000 may select a product set to be recommended to a user from among a plurality of product sets based on the determined user's satisfaction. In operation 780, the device 1000 may display a selected product set or at least one product included in the selected product set.

Operations S760 and S780 of FIG. 7 correspond to operations S260 and S280 of FIG. 2, respectively, and thus a detailed description thereof will not be given herein.

Figure 8:
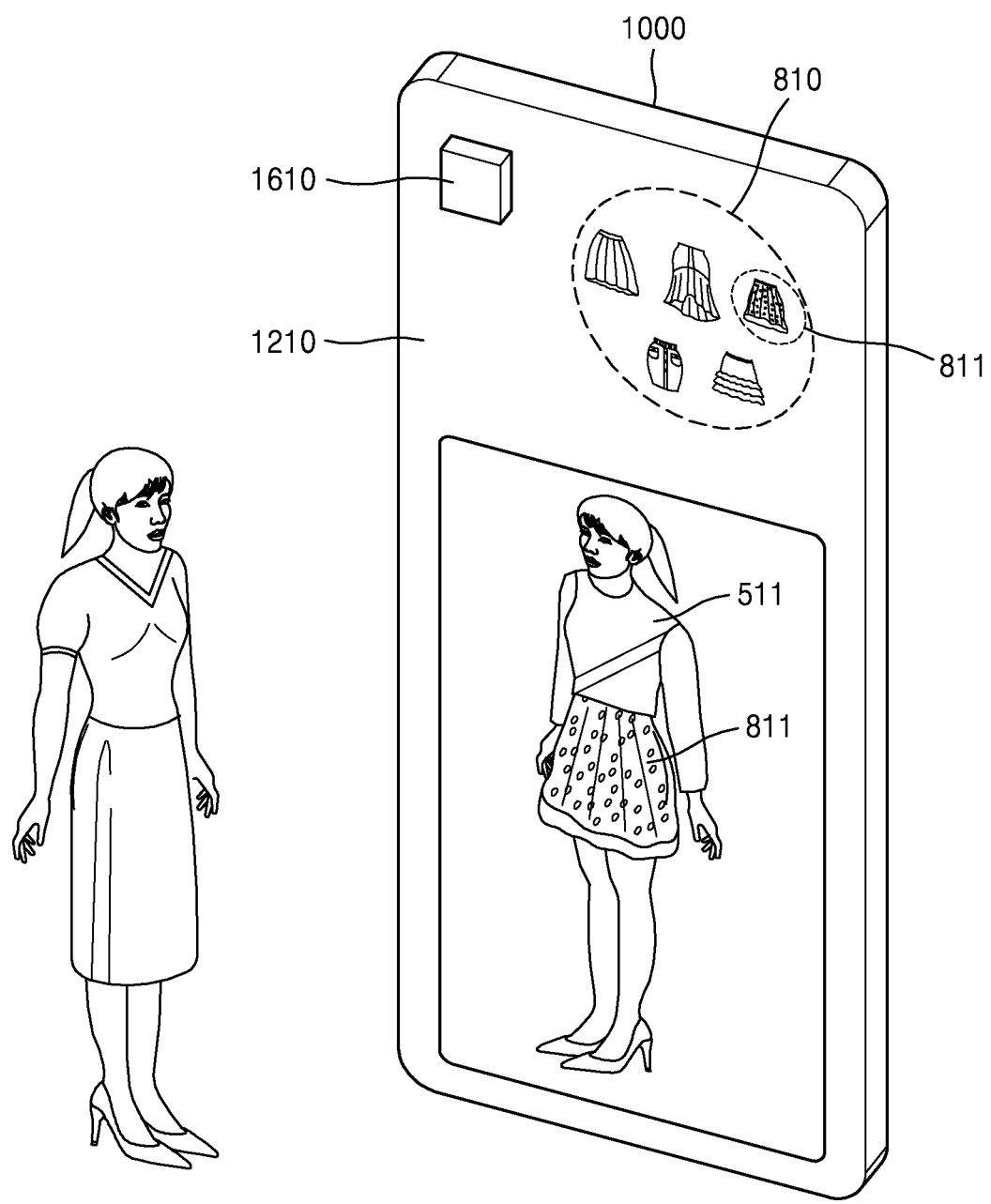
FIG. 8 is a view of an example in which the device 1000 according to an embodiment recommends a product set that includes other products that can be worn with a displayed product.

FIG. 8 is a view of an example in which the device 1000 according to an embodiment recommends a product set that includes other products that can be worn with a displayed product.

Referring to FIG. 8, the device 1000 may select another product set 810 including other products that may be worn with the displayed product 511. The device 1000 may display another product 811 included in the other selected product set 810.

In an embodiment, the device 1000 may select the other product set 810 to be recommended based on other users' purchase history information with respect to the displayed product 511. The device 1000 may display the other selected product set 810 or may display the other product 811 included in the other selected product set.

In addition, the device 1000 may display the displayed product 511 and the other selected product 811 together. The device 1000 may display products included in the selected product set 810 at preset time intervals in a preset order together with the displayed product 511.

In an embodiment, the device 1000 may re-recommend a product to be worn with the displayed product based on the user's satisfaction.

For example, the device 1000 may obtain information about a user's emotional state for the selected product set 810 or the selected product 811. The device 1000 may determine the user's satisfaction with the product set 810 or the product 811 recommended as a product to be worn together based on the obtained emotional information. The device 1000 may re-select a product set or a product to be worn together to be recommended to a user based on the determined user's satisfaction.

Figure 9:
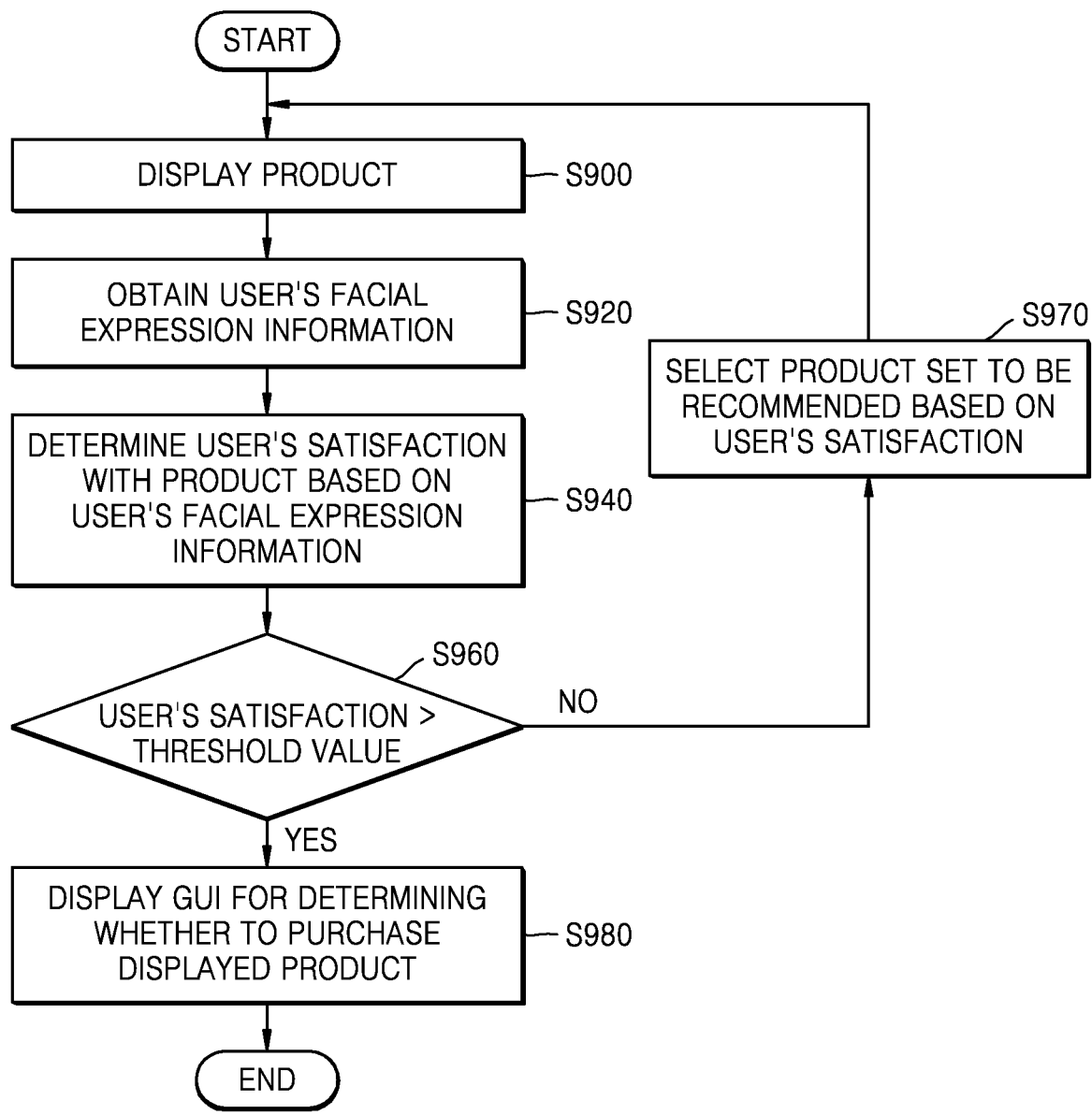
FIG. 9 is a flowchart of a method, performed by the device 1000, of determining whether a user has purchased a product, according to an embodiment.

FIG. 9 is a flowchart of a method, performed by the device 1000, of determining whether a user has purchased a product, according to an embodiment.

Referring to FIG. 9, in operation S900, the device 1000 may display a product. In operation S920, the device 1000 may obtain user's facial expression information about the displayed product. In operation S940, the device 1000 may determine the user's satisfaction with the displayed product based on the user's facial expression information.

Operations S900 to S940 of FIG. 9 correspond to operations S200 to S240 of FIG. 2, respectively, and thus a detailed description thereof will not be given herein.

In operation S960, the device 1000 may determine whether the determined user's satisfaction is greater than or equal to a threshold value related to user's purchase intention.

In an embodiment, the threshold related to the user's purchase intention may be set in advance in the device 1000 or a server, and the device 1000 may obtain the threshold from a user. The threshold value related to the user's purchase intention may be set differently for each user.

In operation S970, when the determined user's satisfaction is less than or equal to the threshold value related to the user's purchase intention, the device 1000 may select a product set to be recommended based on the user's satisfaction.

In operation S980, when the determined user's satisfaction is greater than or equal to the threshold value related to the user's purchase intention, the device 1000 may display a GUI for determining whether to purchase the displayed product.

The GUI (Graphic User Interface) may be a pop-up window for inquiring whether or not to purchase the product on the display 1210. The device 1000 may determine whether a user purchases the product by receiving a user's touch on the display 1210 or may determine whether a user purchases the product by receiving an external input.

When user's purchase is determined, the device 1000 may include a product purchased by a user in a shopping cart on the device 1000. Also, when the user's purchase is determined, the device 1000 may display the GUI for payment of a product price.

Although not shown, the device 1000 may modify and display the product based on user's body information.

The device 1000 may obtain a user's body image by using the camera 1610 and may obtain user's body information from the obtained user's body image. The device 1000 may modify the shape of the product and display the product based on the obtained user's body information. The device 1000 may display a product in a state in which a user wears the product.

In addition, the device 1000 may obtain a user's reference face image before displaying the modified product according to the user's body information. The device 1000 may display the modified product according to the user's body information and then obtain a user's changed face image.

In addition, the device 1000 may display a product and another product that may be worn together with the product in a state that the user wears them.

Figure 10:
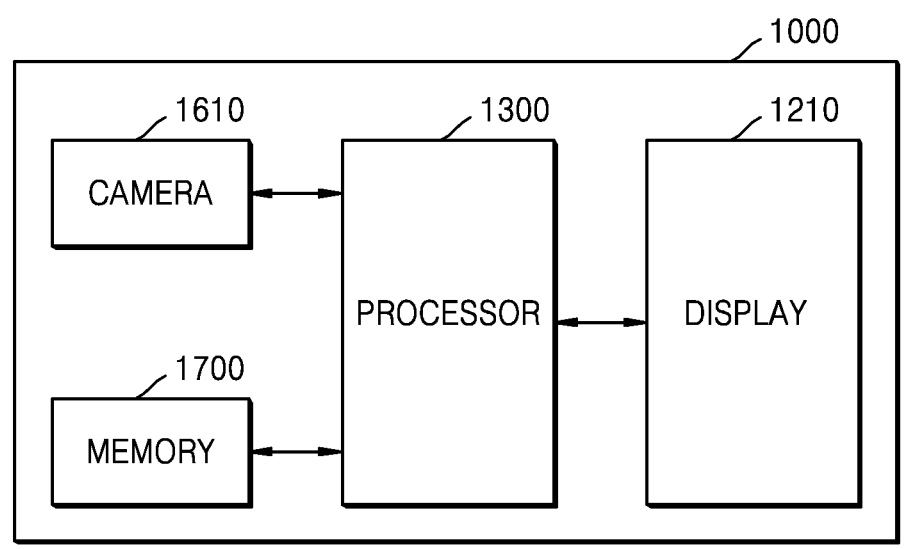
FIGS. 10 and 11 are block diagrams of the device 1000 according to an embodiment.
Figure 11:
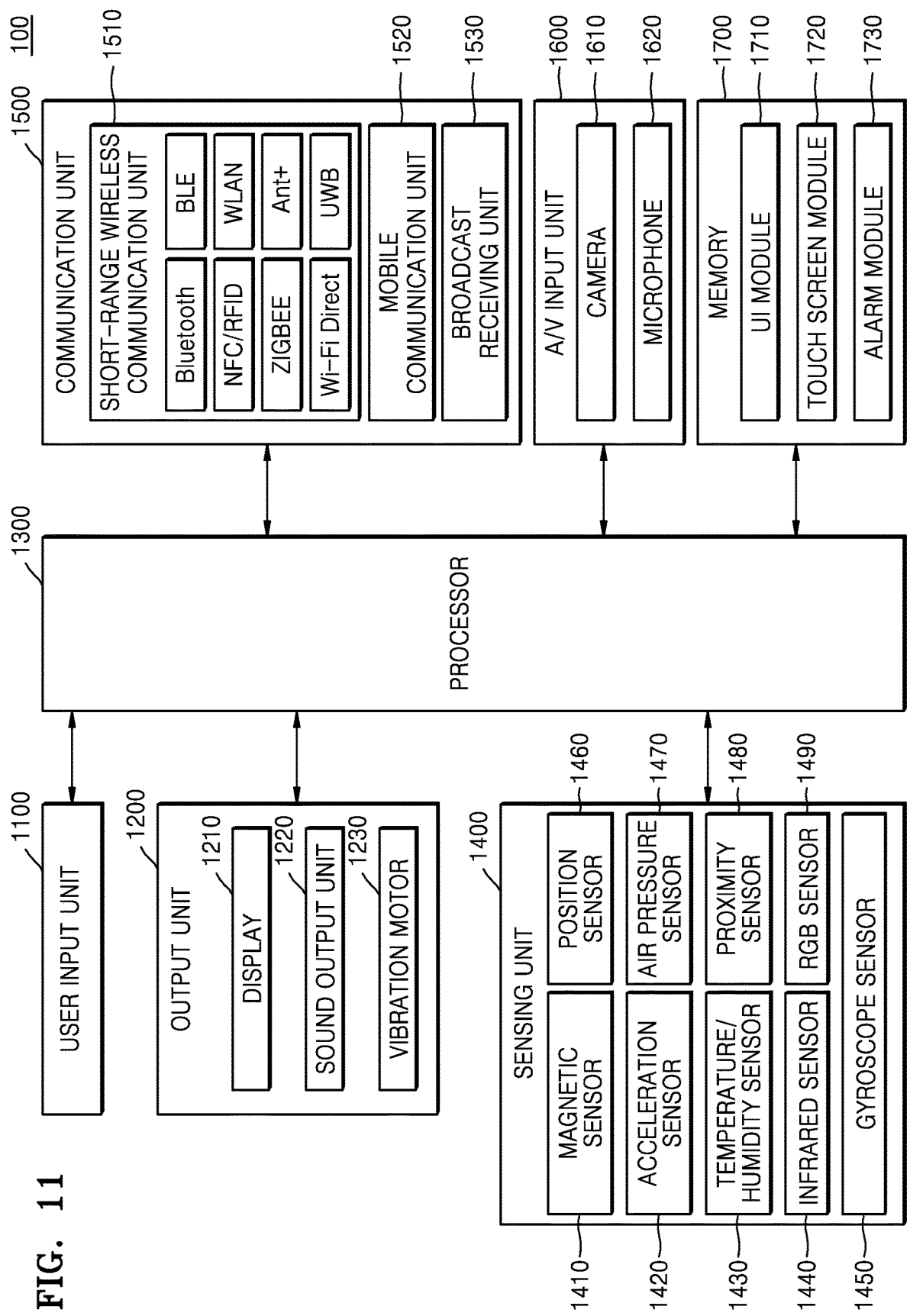

FIGS. 10 and 11 are block diagrams of the device 1000 according to an embodiment.

As illustrated in FIG. 10, the device 1000 according to an embodiment may include a display 1210, a processor 1300, a camera 1610, and a memory 1700. However, the number of components of the device 1000 may be greater or less than that illustrated in FIG. 10.

For example, as illustrated in FIG. 11, the device 1000 according to an embodiment may further include a user input unit 1100, an output unit 1200, a sensing unit 1400, a communication unit 1500, and an audio/video (A/V) input unit 1600 in addition to the display 1210, the processor 1300, the camera 1610, and the memory 1700.

The user input unit 1100 may be a part by which a user inputs data so as to control the device 1000. For example, the user input unit 1100 may include, but is not limited to, a keypad, a dome switch, a touch pad (a contact capacitance type, a pressure resistance film type, an infrared detection type, a surface ultrasonic conduction type, a integral tension measurement type, a piezoelectric effect type, etc.), a jog wheel, a jog switch, or the like.

The user input unit 1100 may receive a user input for selecting a product to be displayed. Also, the user input unit 1100 may receive user input for related information and user input for product purchase intention.

The output unit 1200, which outputs an audio signal, a video signal, or a vibration signal, may include the display 1210, a sound output unit 1220, a vibration motor 1230, or the like.

The display 1210 displays information processed in the device 1000 by being controlled by the processor 1300 to be described later below.

The display 1210 may display a product selected by a user. In addition, the display 1210 may display at least one product included in a product set selected by the device 1000. The display 1210 may modify the product based on user's body information and display the modified product.

Also, the display 1210 may display a GUI for determining whether to purchase the displayed product. The display 1210 may display a GUI for determining whether to purchase a product when determined user's satisfaction is greater than or equal to a threshold value related to user's purchase intention.

The sound output unit 1220 outputs audio data that is received from the communication unit 1500 or stored in the memory 1700. The sound output unit 1220 may also output a sound signal (e.g., a call signal receiving sound, a message receiving sound, a notifying sound, or the like) related to functions performed by the device 1000.

The vibration motor 1230 may output a vibration signal. For example, the vibration motor 1230 may output a vibration signal that corresponds to an output of audio data (e.g., the call signal receiving sound, the message receiving sound, or the like) or video data. Also, when a touch is input to the touch screen, the vibration motor 1230 may output a vibration signal.

The processor 1300 may include one or more processors to control other components included in the device 1000. For example, the processor 1300 may generally control the user input unit 1100, the output unit 1200, the sensing unit 1400, the communication unit 1500, the A/V input unit 1600, and the like by executing programs stored in the memory 1700. Furthermore, the processor 1300 may perform functions of the device 1000 described in FIGS. 1 to 9 by executing the programs stored in the memory 1700.

In more detail, the processor 1300 may obtain user's facial expression information about the displayed product. The processor 1300 may obtain the user's facial expression information from a user's face image obtained by using the camera 1610.

Furthermore, the processor 1300 may determine the user's satisfaction with the displayed product based on the user's facial expression information. The processor 1300 may obtain information about a user's emotional state about the displayed product from the user's facial expression information. The processor 1300 may determine the user's satisfaction corresponding to the obtained emotional information.

In addition, the processor 1300 may select a product set to be recommended to a user from among a plurality of product sets based on the user's satisfaction. The processor 1300 may select a product set to be recommended based on the user's satisfaction with the displayed product, a set including the displayed product, and a similarity between the plurality of product sets. The processor 1300 may obtain related information and may select a product set to be recommended to a user based on the determined satisfaction and the obtained related information.

In addition, the processor 1300 may obtain operation information and may determine the user's satisfaction with the displayed product based on the user's facial expression information and the operation information.

Furthermore, the processor 1300 may select a product set to be recommended based on other users' purchase history information with respect to the displayed product. The processor 1300 may select another product set including other products that may be worn with the displayed product.

In addition, the processor 1300 may display a GUI for determining whether to purchase the displayed product based on the user's satisfaction. The processor 1300 may display the GUI for determining whether to purchase the displayed product when the determined user's satisfaction is greater than or equal to a threshold value related to user's purchase intention.

The sensing unit 1400 may sense a state of the device 1000 or a state around the device 1000 and may transmit sensed information to the processor 1300.

The sensing unit 1400 may include, but is not limited to, at least one of a magnetic sensor 1410, an acceleration sensor 1420, a temperature/humidity sensor 1430, an infrared sensor 1440, a gyroscope sensor 1450, a position sensor (e.g., GPS) 1460, an air pressure sensor 1470, a proximity sensor 1480, and an RGB sensor (i.e., a luminance sensor) 1490. Functions of the sensors may be intuitionally deduced by one of ordinary skill in the art by referring to names of the sensors, and thus, detailed descriptions thereof will not be given herein.

The communication unit 1500 may include one or more components that allow communication between the device 1000 and another device (not shown) or between the device 1000 and a server 2000. The other device (not shown) may be a computing device such as the device 1000, or may be a sensing device, but is not limited thereto. For example, the communication unit 1500 may include a short-range wireless communication unit 1510, a mobile communication unit 1520, and a broadcast receiving unit 1530.

The short-range wireless communication unit 1510 may include, but is not limited to, a Bluetooth communication unit, a Bluetooth low energy (BLE) communication unit, a near-field communication unit, a WLAN communication unit, a zigbee communication unit, an infrared data association (IrDA) communication unit, a Wi-Fi direct (WFD) communication unit, an ultra wideband (UWB) communication unit, and an Ant+ communication unit.

The mobile communication unit 1520 exchanges a wireless signal with at least one of a base station, an external terminal, and a server on a mobile communication network. The wireless signal may include various types of data according to communication in regard to a sound call signal, a video call signal, or a text/multimedia message.

The broadcast receiving unit 1530 receives a broadcast signal and/or information related to broadcast from the outside through a broadcast channel. The broadcast channel may include a satellite channel and a terrestrial channel. According to an embodiment, the device 1000 may not include the broadcast receiving unit 1530.

The communication unit 1500 transmits and receives data to and from another device and the server 2000 by being controlled by the processor 1300. The communication unit 1500 may transmit data directly to another device or via the server 2000. Further, the communication unit 1500 may receive data directly from another device or via the server 2000.

In addition, the communication unit 1500 determines satisfaction based on the user's facial expression information, and may transmit and receive information necessary for selecting a product set to be recommended to a user to and from another device (not shown) and the server 2000 based on the determined satisfaction.

The A/V input unit 1600 may receive an input of an audio signal or a video signal and may include the camera 1610 and the microphone 1620. The camera 1610 may obtain an image frame such as a still image or a moving image through an image sensor during a video call mode or an image-capturing mode. An image that is captured through the image sensor may be processed by the processor 1300 or a separate image processing unit (not shown).

The camera 1610 may capture a user's face or body for the displayed product. User's facial expression information, operation information, and related information may be obtained from the user's image captured by the camera 1610.

The image frame that is processed by the camera 1610 may be stored in the memory 1700 or may be transmitted to the outside through the communication unit 1500. According to a configuration of a terminal, two or more cameras 1610 may be arranged.

The microphone 1620 receives an input of an external sound signal and processes the received sound signal into electrical voice data. For example, the microphone 1620 may receive a sound signal from an external device or a user. In order to remove noise that occurs while the sound signal is externally input, the microphone 1620 may use various noise removing algorithms.

The microphone 1620 may receive a user's input to be received in the form of voice when determining whether to select a product or purchase a product.

The memory 1700 may store at least one program for processing and controlling the processor 1300, and may store data that is input or output to or from the device 1000.

The memory 1700 may include at least one type of storage medium from among a flash memory type memory, a hard disk type memory, a multimedia card micro type memory, a card type memory (for example, SD or XD memory), random access memory (RAM), static random access memory (static RAM), read-only memory (ROM), electrically erasable programmable read-only memory (EEPROM), programmable ROM (PROM), a magnetic memory, a magnetic disk, or an optical disk. Furthermore, the device 1000 may operate a web storage or a cloud server that performs a storage function of the memory 1700 on the Internet.

The programs stored in the memory 1700 may be classified into a plurality of modules according to their functions, for example, a user interface (UI) module 1710, a touch screen module 1720, an alarm module 1730, etc.

The UI module 1710 may provide a specialized UI or a GUI in connection with the device 1000 for each application. The touch screen module 1720 may detect a user's touch gesture on a touch screen and transmit information about the touch gesture to the processor 1300. The touch screen module 1720 according to an embodiment may recognize and analyze a touch code. The touch screen module 1720 may be configured by using additional hardware including a controller.

The alarm module 1730 may generate a signal for notifying the user of an occurrence of an event in the device 1000. Examples of the event that occurs in the device 1000 may include a call signal reception, a message reception, a key signal input, schedule notification, or the like. The alarm module 1730 may output a video-format alarm signal via the display 1210, may output an audio-format alarm signal via the sound output unit 1220, or may output a vibration-format alarm signal via the vibration motor 1230.

The memory 1700 may store information about a display order of products included in a product set, and may store configuration, location, size, and the like of the products with respect to display.

In addition, the memory 1700 may store facial expression information, a face image according to the facial expression information, and a keypoint corresponding to the facial expression information. The memory 1700 may store an emotional state corresponding to the facial expression information, and may store a correspondence relationship between the emotional state and user's satisfaction.

Also, the memory 1700 may store a similarity between a plurality of product sets. The memory 1700 may store the similarity between the plurality of product sets such that pairs of product sets have respective similarities.

Figure 12:
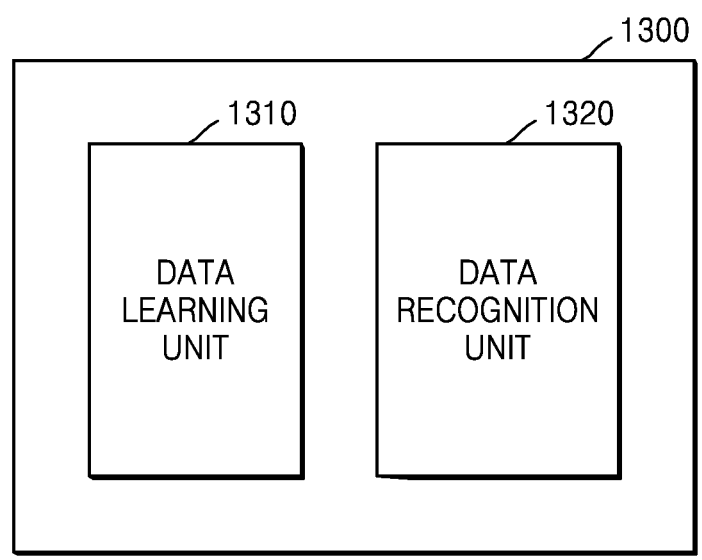
FIG. 12 is a block diagram of a processor 1300 according to an embodiment.

FIG. 12 is a block diagram of the processor 1300 according to an embodiment.

Referring to FIG. 12, the processor 1300 according to some embodiments may include a model learning unit 1310 and a data recognition unit 1320.

The trained model described above may be the same as a data determination model described later below.

The model learning unit 1310 may learn a criterion for product recommendation. The model learning unit 1310 may learn a criterion on what data is used to recommend a certain product and how to recommend the product using the data. The model learning unit 1310 may obtain data to be used for learning and apply the obtained data to the data determination model to be described later below, so that the model learning unit 1310 may learn a criterion for product recommendation.

The data recognition unit 1320 may recommend a product based on the data. The data recognition unit 1320 may recommend a product in a certain product set from certain data using the trained data determination model. The data recognition unit 1320 may obtain certain data according to a criterion preset by learning and use the data determination model with the obtained data as an input value so that may recommend a certain product based on the certain data. Further, a resultant value output by the data determination model with the obtained data as the input value may be used to update the data determination model.

At least one of the model learning unit 1310 and the data recognition unit 1320 may be manufactured in the form of at least one hardware chip and mounted on the device 1000. For example, at least one of the model learning unit 1310 and the data recognition unit 1320 may be manufactured in the form of a dedicated hardware chip for artificial intelligence (AI) or may be manufactured as a portion of a conventional general-purpose processor (e.g., a central processing unit (CPU) or an application processor) or a graphics-dedicated processor (e.g., a graphic processing unit (GPU)) to be mounted on the device 1000.

In this case, the model learning unit 1310 and the data recognition unit 1320 may be mounted on one device 1000 or on separate devices 1000, respectively. For example, one of the model learning unit 1310 and the data recognition unit 1320 may be included in the device 1000 and the other one may be included in a server. Furthermore, the model learning unit 1310 and the data recognition unit 1320 may provide model information constructed by the model learning unit 1310 to the data recognition unit 1320 in a wired or wireless manner, and data input to the data recognition unit 1320 may be provided to the model learning unit 1310 as additional training data.

Meanwhile, at least one of the model learning unit 1310 and the data recognition unit 1320 may be implemented as a software module. When at least one of the model learning unit 1310 and the data recognition unit 1320 is implemented as a software module (or a program module including instructions), the software module may be stored in a non-transitory computer-readable recording medium. Alternatively, at least one software module may be provided by an operating system (OS) or a certain application. Alternatively, some of the at least one software module may be provided by the OS, and the remaining ones may be provided by a certain application.

Figure 13:
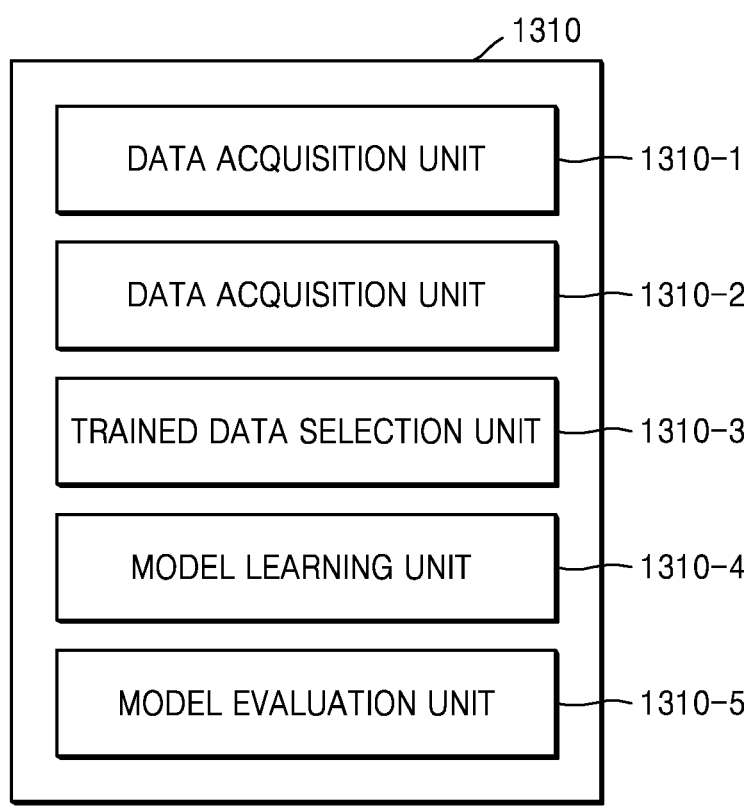
FIG. 13 is a block diagram of a model learning unit 1310 according to an embodiment.

FIG. 13 is a block diagram of the model learning unit 1310 according to an embodiment.

Referring to FIG. 13, the model learning unit 1310 according to some embodiments may include a data acquisition unit 1310-1, a pre-processing unit 1310-2, a trained data selection unit 1310-3, a model learning unit 1310-4, and a model evaluation unit 1310-5.

The data acquisition unit 1310-1 may obtain data necessary for product recommendation. The data acquisition unit 1310-1 may obtain data necessary for learning for product recommendation.

In an embodiment, the data acquisition unit 1310-1 may obtain information about the face, facial expression, voice, and operation of a person. Also, the data acquisition unit 1310-1 may obtain data on the sex, the height, the weight, the age, the purchase history, the occupation, the clothing, and the income of the person.

Furthermore, the data acquisition unit 1310-1 may obtain image data. The image data may be still image data or moving image data. The data acquisition unit 1310-1 may obtain image data using the camera 1610 of the device 1000 including the model learning unit 1310. Alternatively, the data acquisition unit 1310-1 may obtain the image data through an external device communicating with the device 1000.

For example, the data acquisition unit 1310-1 may obtain a face image representing human facial expression information, or may obtain a gesture image or a body image that represents human operation information.

Furthermore, the data acquisition unit 1310-1 may obtain data of a product. The data acquisition unit 1310-1 may obtain data on a design, material, color, a wearer's body part, and wearing season of the product.

The pre-processing unit 1310-2 may pre-process the obtained data so that the obtained data may be used for learning for product recommendation. The pre-processing unit 1310-2 may process the obtained data into a preset format so that the model learning unit 1310-4, which will be described later below, may use the obtained data for learning for product recommendation.

The trained data selection unit 1310-3 may select data necessary for learning from the pre-processed data. The selected data may be provided to the model learning unit 1310-4. The trained data selection unit 1310-3 may select data necessary for learning from the pre-processed data according to a preset criterion for product recommendation. The trained data selection unit 1310-3 may also select data according to the preset criterion by learning by the model learning unit 1310-4, which will be described later below.

The model learning unit 1310-4 may learn a criterion on how to recommend a product according to user's satisfaction with a displayed product based on trained data. Also, the model learning unit 1310-4 may learn a criterion on which trained data should be used for product recommendation.

For example, the model learning unit 1310-4 may learn a criterion on how to obtain facial expression information based on obtained user's image data, and may learn a criterion on how to obtain operation information based on obtained user's body image data.

In addition, the model learning unit 1310-4 may learn a criterion on how to determine user's emotional state based on user's facial expression information or operation information. Furthermore, the model learning unit 1310-4 may learn a criterion on how to determine the user's satisfaction based on the user's emotional state.

Also, the model learning unit 1310-4 may learn a criterion on how to set a similarity between a plurality of product sets including a product. For example, the model learning unit 1310-4 may set the similarity between product sets based on a plurality of parameters such as a design, material, color, a wearer's body part, a wearing season, etc. of the product included in the product sets.

Also, the model learning unit 1310-4 may learn a criterion on how to recommend the product based on user's facial expression information, operation information, related information, or the similarity between product sets.

In the above description, it has been described that the acquisition of the facial expression information, the acquisition of the operation information, the determination of the emotional state, the determination of the satisfaction, the determination of the similarity between the plurality of product sets, and the product recommendation are performed based on separate learning, but are not limited thereto. At least two of the acquisition of the facial expression information, the acquisition of the operation information, the determination of the emotional state, the determination of the satisfaction, the determination of the similarity between the plurality of product sets, and the product recommendation may be performed by one data determination model.

For example, the model learning unit 1310-4 may receive the user's facial expression information by using the data determination model and may output a product to be recommended to a user. Furthermore, the model learning unit 1310-4 may receive the user's facial expression information by using a plurality of data determination models and may output a product to be recommended to a user. In this case, when there is a first data determination model for determining satisfaction and a second data determination model for recommending a product, the model learning unit 1310-4 may determine the user's satisfaction from the user's facial expression information by using the first data determination model and then may select a product to be recommended to a user from the user's satisfaction by using the second data determination model.

Also, the model learning unit 1310-4 may train a data determination model used for product recommendation by using trained data. In this case, the data determination model may be a pre-built model. For example, the data determination model may be a pre-built model that receives basic trained data (e.g., a sample image, etc.).

The data determination model may be built considering an application field of the recognition model, the purpose of learning, or the computer performance of a device. The data determination model may be, for example, a model based on a neural network. For example, models such as Deep Neural Network (DNN), Recurrent Neural Network (RNN), and Bidirectional Recurrent Deep Neural Network (BRDNN) may be used as a data determination model, but the present disclosure is not limited thereto.

According to various embodiments, when there are a plurality of data determination models that are built in advance, the model learning unit 1310-4 may determine a data determination model that is highly relevant to input trained data and basic trained data as a data determination model to be learned. In this case, the basic trained data may be pre-classified for each type of data, and the data determination model may be pre-built for each type of data. For example, the basic trained data may be pre-classified based on various criteria such as an area where the trained data is generated, time at which the trained data is generated, a size of the trained data, a genre of the trained data, a creator of the trained data, the type of an object in the trained data, and the like.

In addition, the model learning unit 1310-4 may train the data determination model by using, for example, a learning algorithm including error back-propagation or gradient descent.

Also, the model learning unit 1310-4 may train the data determination model through, for example, supervised learning using the trained data as an input value. The model learning unit 1310-4 may also train the data determination model through unsupervised learning that finds a criterion for product recommendation by self-learning, for example, the type of data necessary for product recommendation without any guidance. Further, the model learning unit 1310-4 may train the data determination model through reinforcement learning using, for example, feedback on whether a result of the product recommendation based on the learning is correct.

Further, when the data determination model is trained, the model learning unit 1310-4 may store the trained data determination model. In this case, the model learning unit 1310-4 may store the trained data determination model in a memory of the device 1000 including the data recognition unit 1320. Alternatively, the model learning unit 1310-4 may store the trained data determination model in the memory of the device 1000 including the data recognition unit 1320 to be described later below. Alternatively, the model learning unit 1310-4 may store the trained data determination model in a memory of a server connected to the device 1000 via a wired or wireless network.

In this case, the memory in which the trained data determination model is stored may store, for example, commands or data related to at least one other component of the device 1000 together. The memory may also store software and/or a program. The program may include, for example, a kernel, middleware, an application programming interface (API) and/or an application program (or "application"), or the like.

The model evaluation unit 1310-5 inputs the evaluation data to the data determination model. When a recognition result output from the evaluation data does not satisfy a certain criterion, the model evaluation unit 1310-5 may allow the model learning unit 1310-4 to learn again. In this case, the evaluation data may be preset data for evaluating the data determination model.

For example, among recognition results of a trained data determination model for evaluation data, when the number or the ratio of evaluation data whose recognition result is not correct exceeds a preset threshold value, the model evaluation unit 1310-5 may evaluate that the data determination model does not satisfy the certain criterion. For example, when the certain criterion is defined as a ratio of 2%, and when the trained data determination model outputs an incorrect recognition result for evaluation data exceeding 20 out of a total of 1000 evaluation data, the model evaluation unit 1310-5 may evaluate that the trained data determination model is inappropriate.

Meanwhile, when there are a plurality of trained data determination models, the model evaluation unit 1310-5 may evaluate whether each of the trained data determination models satisfies a certain criterion, and may determine a model that satisfies the certain criterion as a final data determination model. In this case, when there are a plurality of models satisfying the certain criterion, the model evaluation unit 1310-5 may determine any one or a certain number of models preset in the order of higher evaluation scores as a final data determination model.

Meanwhile, at least one of the data acquisition unit 1310-1, the pre-processing unit 1310-2, the trained data selection unit 1310-3, the model learning unit 1310-4, and the model evaluation unit 1310-5 in the model learning unit 1310 may be manufactured in the form of at least one hardware chip and mounted on the device 1000. For example, at least one of the data acquisition unit 1310-1, the pre-processing unit 1310-2, the trained data selection unit 1310-3, the model learning unit 1310-4, and the model evaluation unit 1310-5 may be manufactured in the form of a dedicated hardware chip for artificial intelligence (AI) or may be manufactured as a portion of a conventional general-purpose processor (e.g., a CPU or an application processor) or a graphics-dedicated processor (e.g., a GPU) to be mounted on the various devices 1000 as described above.

Furthermore, the data acquisition unit 1310-1, the pre-processing unit 1310-2, the trained data selection unit 1310-3, the model learning unit 1310-4, and the model evaluation unit 1310-5 may be mounted on one device 1000 or may be mounted on separate devices, respectively. For example, some of the data acquisition unit 1310-1, the pre-processing unit 1310-2, the trained data selection unit 1310-3, the model learning unit 1310-4, and the model evaluation unit 1310-5 may be included in the device 1000 and the remaining ones may be included in the server.

Furthermore, at least one of the data acquisition unit 1310-1, the pre-processing unit 1310-2, the trained data selection unit 1310-3, the model learning unit 1310-4, and the model evaluation unit 1310-5 may be implemented as a software module. When at least one of the data acquisition unit 1310-1, the pre-processing unit 1310-2, the trained data selection unit 1310-3, the model learning unit 1310-4, and the model evaluation unit 1310-5 is implemented as a software module (or a program module including instructions), the software module may be stored in a non-transitory computer-readable recording medium. Alternatively, at least one software module may be provided by an operating system (OS) or a certain application. Alternatively, some of the at least one software module may be provided by the OS, and the remaining ones may be provided by a certain application.

Figure 14:
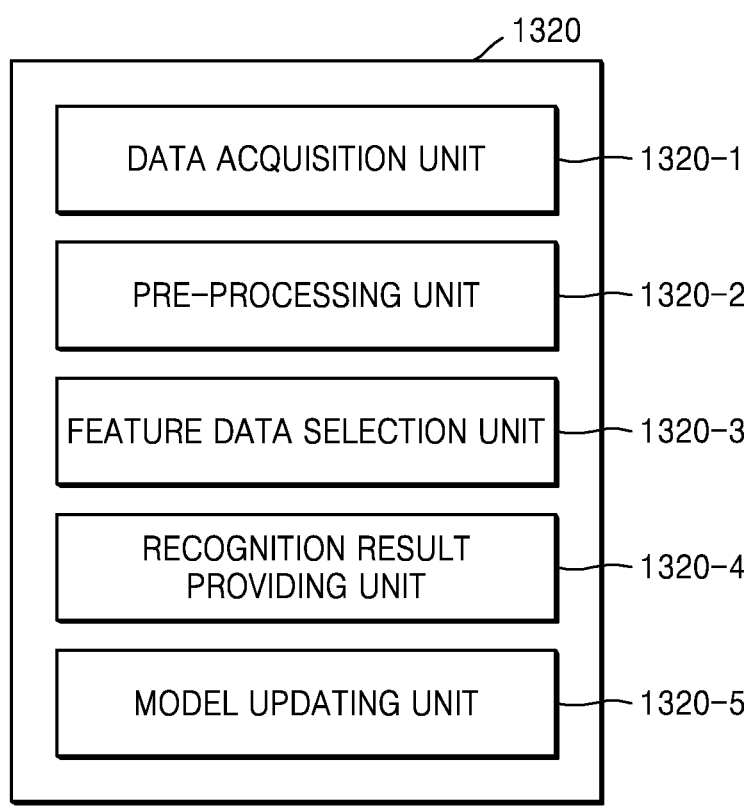
FIG. 14 is a block diagram of a data recognition unit 1320 according to an embodiment.

FIG. 14 is a block diagram of the data recognition unit 1320 according to an embodiment.

Referring to FIG. 14, the data recognition unit 1320 according to some embodiments may include a data acquisition unit 1320-1, a pre-processing unit 1320-2, a feature data selection unit 1320-3, a recognition result providing unit 1320-4, and a model updating unit 1320-5.

The data acquisition unit 1320-1 may obtain data necessary for product recommendation. The data acquisition unit 1320-1 may obtain user's face image data and user's body image data using a camera.

Also, the data acquisition unit 1320-1 may obtain related information. For example, the data acquisition unit 1320-1 may obtain data on user's sex, a user's height, a user's weight, a user's age, a user's purchase history, a user's occupation, user's clothing, and user's income.

In addition, the data acquisition unit 1320-1 may obtain data on a product selected by the user. For example, the data acquisition unit 1320-1 may obtain image data of the product.

The pre-processing unit 1320-2 may pre-process the obtained data so that the obtained data may be used for product recommendation. The pre-processing unit 1320-2 may process the obtained data into a preset format so that the recognition result providing unit 1320-4, which will be described later below, may use the obtained data for product recommendation.

The feature data selection unit 1320-3 may select data necessary for product recommendation from pre-processed data. The selected data may be provided to the recognition result providing unit 1320-4. The feature data selection unit 1320-3 may select some or all of the pre-processed data according to a preset criterion for product recommendation. Also, the feature data selection unit 1320-3 may also select data according to the preset criterion by learning by the model learning unit 1310-4, which will be described later below.

The recognition result providing unit 1320-4 may recommend a product by applying the selected data to the data determination model. The recognition result providing unit 1320-4 may provide a recognition result according to a data recognition purpose. The recognition result providing unit 1320-4 may apply the selected data to the data determination model by using the data selected by the feature data selection unit 1320-3 as an input value. In addition, the recognition result may be determined by the data determination model.

For example, a recognition result of a user image may be provided as text, voice, a moving image, an image or instruction (e.g., an application execution instruction, a module function execution instruction, etc.) The recognition result providing unit 1320-4 may provide the recognition result by applying the user image to the data determination model. Also, the recognition result providing unit 1320-4 may provide the recognition result by applying a product image to the data determination model.

In an embodiment, the recognition result providing unit 1320-4 may provide a recognition result of user's facial expressions or user's operations included in the user image. The recognition result of the user's image may be, for example, a user's emotional state, user's satisfaction, related information, and the like.

In an embodiment, the recognition result providing unit 1320-4 may provide a similarity between product sets including a product as a result of recognizing the product image. A similarity between two product sets may be recognized using parameters of products included in the two product sets, and the recognition result may be provided as a numerical value.

Also, the recognition result providing unit 1320-4 may recommend a product to a user by applying a user image, data on a product, a similarity between a plurality of product sets, related information, and the like to the data determination model. The recognition result providing unit 1320-4 may apply the selected data to the recognition model to provide a product to be recommended to a user based on a user's satisfaction and the similarity between a plurality of product sets. The recognition result provided by the recognition result providing unit 1320-4 may be one product to be recommended to a user or a product set including the at least one product.

The model updating unit 1320-5 may update the data determination model based on an evaluation of the recognition result provided by the recognition result providing unit 1320-4. For example, the model updating unit 1320-5 provides the recognition result provided by the recognition result providing unit 1320-4 to the model learning unit 1310-4 so that the model learning unit 1310-4 may update the data determination model.

Meanwhile, at least one of the data acquisition unit 1320-1, the pre-processing unit 1320-2, the feature data selection unit 1320-3, the recognition result providing unit 1320-4, and the model updating unit 1320-5 in the data recognition unit 1320 may be manufactured in the form of at least one hardware chip and mounted on the device 1000. For example, at least one of the data acquisition unit 1320-1, the pre-processing unit 1320-2, the feature data selection unit 1320-3, the recognition result providing unit 1320-4, and the model updating unit 1320-5 may be manufactured in the form of a dedicated hardware chip for AI or may be manufactured as a portion of a conventional general-purpose processor (e.g., a CPU or an application processor) or a graphics-dedicated processor (e.g., a GPU) to be mounted on the various devices 1000 as described above.

Furthermore, the data acquisition unit 1320-1, the pre-processing unit 1320-2, the feature data selection unit 1320-3, the recognition result providing unit 1320-4, and the model updating unit 1320-5 may be mounted on one device 1000 or may be mounted on separate devices, respectively. For example, some of the data acquisition unit 1320-1, the pre-processing unit 1320-2, the feature data selection unit 1320-3, the recognition result providing unit 1320-4, and the model updating unit 1320-5 may be included in the device 1000 and the remaining ones may be included in the server.

Furthermore, at least one of the data acquisition unit 1320-1, the pre-processing unit 1320-2, the feature data selection unit 1320-3, the recognition result providing unit 1320-4, and the model updating unit 1320-5 may be implemented as a software module. When at least one of the data acquisition unit 1320-1, the pre-processing unit 1320-2, the feature data selection unit 1320-3, the recognition result providing unit 1320-4, and the model updating unit 1320-5 is implemented as a software module (or a program module including instructions), the software module may be stored in a non-transitory computer-readable recording medium. Alternatively, at least one software module may be provided by an operating system (OS) or a certain application. Alternatively, some of the at least one software module may be provided by the OS, and the remaining ones may be provided by a certain application.

Figure 15:
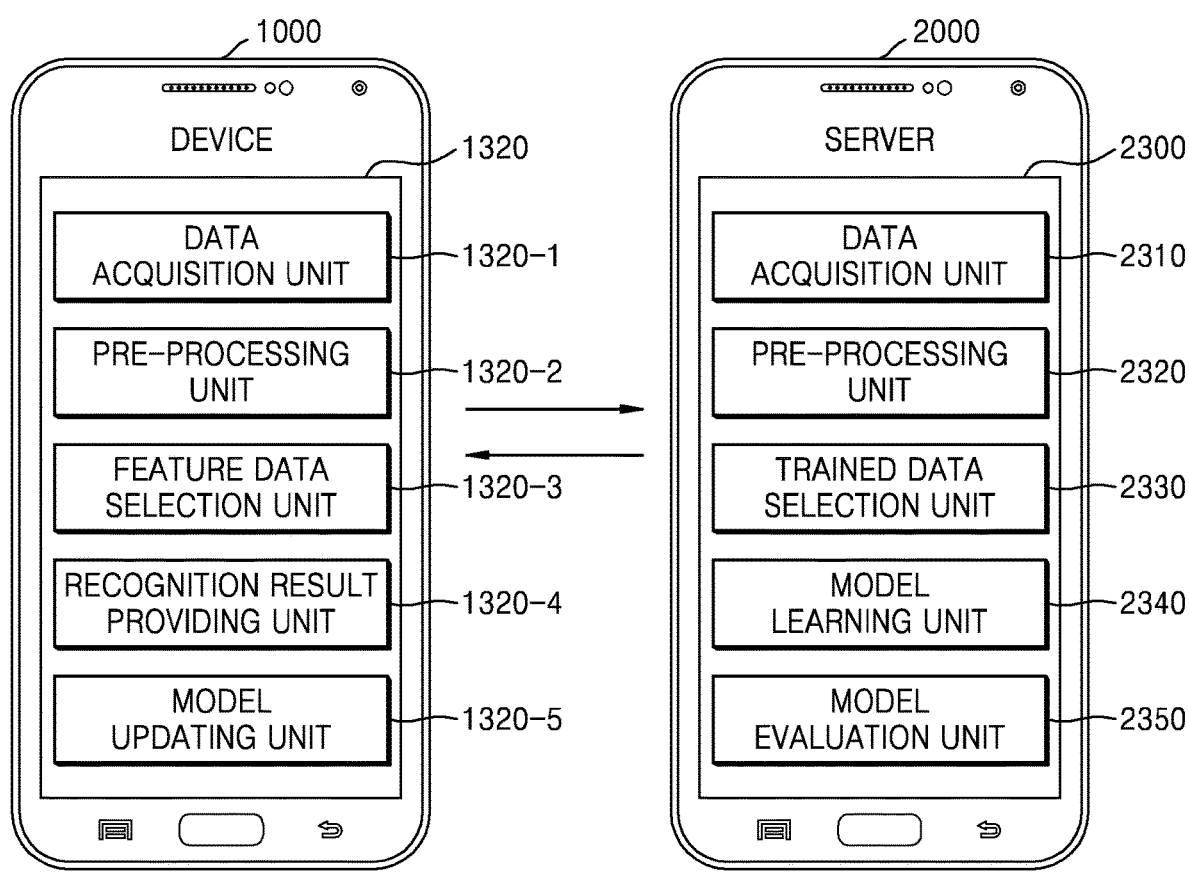
FIG. 15 is a view of an example in which the device 1000 and a server 2000 according to an embodiment interlock with each other to learn and recognize data.

FIG. 15 is a view of an example in which the device 1000 and the server 2000 according to some embodiments interlock with each other to learn and recognize data.

Referring to FIG. 15, the server 2000 may learn a criterion for product recommendation and the device 1000 may recommend a product based on a result of the learning by the server 2000.

In this case, a model learning unit 2340 of the server 2000 may perform the function of the model learning unit 1310 shown in FIG. 12. The model learning unit 2340 of the server 2000 may learn a criterion on what data to use to recommend a certain product and how to recommend the product using the data. The model learning unit 2340 may obtain data to be used for learning and apply the obtained data to a data determination model to be described later below, so that the model learning unit 2340 may learn a criterion for product recommendation.

Also, the recognition result providing unit 1320-4 of the device 1000 may recommend the product by applying the data selected by the feature data selection unit 1320-3 to a data determination model generated by the server 2000. For example, the recognition result providing unit 1320-4 transmits the data selected by the feature data selection unit 1320-3 to the server 2000, and may request the server 2000 to apply the data selected by the feature data selection unit 1320-3 to a recognition model to recommend a product. In addition, the recognition result providing unit 1320-4 may receive from the server 2000 information about the product recommended by the server 2000.

For example, the device 1000 may transmit a user's image, a product image, etc. to the server 2000, and may request the server 2000 to apply the received data to a recognition model to recommend a product. The device 1000 may receive information about a product recommended by the server.

Alternatively, the recognition result providing unit 1320-4 of the device 1000 may receive the recognition model generated by the server 2000 from the server 2000, and may recommend a product using the received recognition model. In this case, the recognition result providing unit 1320-4 of the device 1000 may apply the data selected by the feature data selection unit 1320-3 to the data determination model received from the server 2000 to recommend a product.

For example, the device 1000 may receive the recognition model generated by the server 2000 from the server 2000, and may recommend a product by applying a user's image, a product image, or the like to the received recognition model.

An embodiment of the present disclosure may be embodied as computer readable instructions on a recording medium, e.g., a program module to be executed in computers, the program module including computer-readable instructions. The computer readable medium may be any usable medium that may be accessed by a computer, and may include any usable medium, such as, a volatile and non-volatile medium and a discrete type and non-discrete type medium. Also, the non-transitory computer readable medium may include all computer storing media and communication media. The computer storing medium may include any medium, such as, a volatile and non-volatile medium and a discrete type and non-discrete type medium that is realized by a method or technology for storing information, such as, a computer readable instruction, a data structure, a program module, or other data. The communication medium may include other data of modulated signal, such as, a computer readable instruction, a data structure, a program module, or a carrier signal, or other transmission mechanism, and an arbitrary information medium.

It should be understood that example embodiments described herein should be considered in a descriptive sense only and not for purposes of limitation. Descriptions of features or aspects within each example embodiment should typically be considered as available for other similar features or aspects in other example embodiments. Therefore, the example embodiments should be considered in descriptive sense only and not for purposes of limitation. For example, each constituent element that is described as a singular form may be embodied in distribution forms. Also, constituent elements that are described in distribution forms may be embodied in a combined form.

Therefore, the scopes of the present disclosure are defined not by the detailed description but by the appended claims, and all differences within the scope will be construed as being included in the embodiments.

The invention claimed is:

1. A device comprising:
a display configured to display a product selected by a user;

a camera configured to capture a photograph of the user;
a memory configured to store at least one program; and
at least one processor configured to execute the at least one program to recommend a product based on facial expression information of the user,
wherein the at least one program comprises instructions for:
obtaining the facial expression information of the user from the photograph of the user with respect to the displayed product,
determining a satisfaction of the user with the displayed product based on the obtained facial expression information of the user,
determining a similarity between a product set comprising the displayed product and a plurality of product sets, wherein the similarity corresponds to the determined satisfaction of the user,
selecting a product set for recommendation to the user from among the plurality of product sets and another product set including other products wearable with the displayed product, based on the determined similarity and a historical record of other users selecting product sets of the plurality of product sets, and
displaying at least one product included in the selected product set and at least one product included in the another product set, and
wherein the determining of the satisfaction of the user further comprises:
determining the satisfaction from the facial expression information using a trained model which is trained by using an artificial intelligence algorithm.

2. The device of claim 1, wherein the determining of the satisfaction of the user further comprises:
determining the satisfaction of the user by using the trained model which is trained using at least one of machine learning, a neural network, genes, deep learning, or a classification algorithm as the artificial intelligence algorithm.

3. The device of claim 1,
wherein the at least one program further comprises instructions for obtaining related information used to select the product set, and
wherein a product set for recommendation to the user is selected from among the plurality of product sets based on the determined satisfaction and the obtained related information.

4. The device of claim 3, wherein the related information comprises information about at least one of sex of the user, a height of the user, a weight of the user, an age, a purchase history of the user, an occupation of the user, clothing of the user, or an income of the user.

5. The device of claim 1,
wherein the at least one program further comprises instructions for obtaining operation information of the user viewing the displayed product, and
wherein the determining of the satisfaction of the user further comprises:
determining the satisfaction of the user with the displayed product based on the obtained facial expression information of the user and the operation information.

6. The device of claim 5, wherein the operation information further comprises information about at least one of a gesture of the user, a gaze direction of the user, or a duration that the user views the displayed product.

7. The device of claim 1, wherein the selecting of the product set for recommendation further comprises:
selecting the product set for recommendation based on purchase history information of other users for the displayed product.

8. The device of claim 1, wherein the at least one program further comprises instructions for:
displaying a graphical user interface (GUI) for determining whether to purchase the displayed product based on the determined satisfaction of the user.

9. The device of claim 8, wherein the displaying of the GUI further comprises:
displaying the GUI for determining whether to purchase the displayed product when the determined satisfaction of the user is greater than or equal to a threshold value related to a purchase intention of the user.

10. The device of claim 1, wherein the at least one program further comprises instructions for:
displaying a graphical user interface (GUI) for obtaining an identification (ID) of the user.

11. The device of claim 1, wherein the product set for recommendation to the user from among the plurality of product sets comprises a new product added to an existing set of products.

12. The device of claim 1, wherein the historical record of the other users selecting the product sets of the plurality of product sets comprises at least one of sales volume or reviews of other users.

13. A method, performed by a device, of recommending a product, the method comprising:
displaying a product selected by a user;
obtaining facial expression information of the user with respect to the displayed product;
determining a satisfaction of the user with the displayed product based on the obtained facial expression information of the user;
determining a similarity between a product set comprising the displayed product and a plurality of product sets, wherein the similarity corresponds to the determined satisfaction of the user;
selecting a product set for recommendation to the user from among the plurality of product sets and another product set including other products wearable with the displayed product, based the determined similarity and a historical record of other users selecting product sets of the plurality of product sets; and
displaying at least one product included in the selected product set and at least one product included in the another product set,
wherein the device determines the satisfaction of the user from the facial expression information using a trained model which is trained by using an artificial intelligence algorithm.

14. The method of claim 13, further comprising:
obtaining related information used to select the product set,
wherein the selecting of the product set for recommendation further comprises:
selecting the product set for recommendation to the user from among the plurality of product sets based on the determined satisfaction and the obtained related information.

15. A non-transitory computer-readable recording medium having recorded thereon a program for executing the method of claim 13.

16. The method of claim 13, wherein the product set for recommendation to the user from among the plurality of product sets comprises a new product added to an existing set of products.

* * * * *